US012562038B2

(12) United States Patent
Palmer et al.

(10) Patent No.: US 12,562,038 B2
(45) Date of Patent: Feb. 24, 2026

(54) HAPTIC TRANSDUCER DEVICES AND ASSOCIATED APPARATUSES, SYSTEMS AND METHODS

(71) Applicant: Wing Acoustics Limited, Auckland (NZ)

(72) Inventors: David John Palmer, Auckland (NZ); Michael Ian Palmer, Auckland (NZ)

(73) Assignee: Wing Acoustics Limited, Auckland (NZ)

( * ) Notice: Subject to any disclaimer, the term of this patent is extended or adjusted under 35 U.S.C. 154(b) by 6 days.

(21) Appl. No.: 18/710,883

(22) PCT Filed: Nov. 16, 2022

(86) PCT No.: PCT/IB2022/061013
§ 371 (c)(1),
(2) Date: May 16, 2024

(87) PCT Pub. No.: WO2023/089489
PCT Pub. Date: May 25, 2023

(65) Prior Publication Data
US 2025/0037553 A1 Jan. 30, 2025

(30) Foreign Application Priority Data
Nov. 16, 2021 (NZ) ........................................ 782381

(51) Int. Cl.
*H04B 3/36* (2006.01)
*B06B 1/04* (2006.01)
*G08B 6/00* (2006.01)

(52) U.S. Cl.
CPC ................ *G08B 6/00* (2013.01); *B06B 1/045* (2013.01)

(58) Field of Classification Search
CPC ........... G08B 6/00; B06B 1/045; G06F 3/016; G06F 1/163
See application file for complete search history.

(56) References Cited

U.S. PATENT DOCUMENTS

| | | | | |
|---|---|---|---|---|
| 9,055,778 | B1 * | 6/2015 | Kelley | A43B 3/36 |
| 10,409,376 | B2 * | 9/2019 | Khoshkava | H10N 30/853 |
| 11,122,852 | B2 * | 9/2021 | Andon | B60Q 9/008 |
| 2002/0149561 | A1 | 10/2002 | Fukumoto et al. | |
| 2013/0261704 | A1 | 10/2013 | Aghassian et al. | |
| 2015/0205416 | A1 | 7/2015 | Yairi et al. | |
| 2018/0158290 | A1 | 6/2018 | Khoshkava et al. | |
| 2019/0079583 | A1 | 3/2019 | Alghooneh et al. | |
| 2019/0101986 | A1 | 4/2019 | Khoshkava et al. | |
| 2021/0012628 | A1 | 1/2021 | Doy et al. | |
| 2022/0000213 | A1 * | 1/2022 | Little | H04R 1/02 |

* cited by examiner

*Primary Examiner* — Toan N Pham
(74) *Attorney, Agent, or Firm* — Kolitch Romano Dascenzo Gates LLP

(57) ABSTRACT

A haptic transducer having first and second members that are reciprocally movable relative to one another. The members are magnetic and comprise a compliant member coupled between them. The haptics transducer embodiments are suitable for wearable or handheld devices or apparatuses, such as headphones or footwear as they comprise a low-profile yet provide suitable haptic feedback without significantly altering the compliance of the wearable or handheld device or apparatus.

20 Claims, 11 Drawing Sheets

HAPTIC TRANSDUCER DEVICES AND ASSOCIATED APPARATUSES, SYSTEMS AND METHODS

FIELD OF THE INVENTION

The present invention relates to a haptic transducer device and to devices, including wearable and handheld devices or apparatuses, for receiving and for incorporating the same.

BACKGROUND TO THE INVENTION

Haptic transducers can enhance entertainment experiences by providing haptic stimulation to a user. Such transducers can be used in conjunction with other visual and/or audio systems for a multi-sensory experience. For instance, they could be used in handheld devices such as gaming controllers or wearable devices, such as headphones and shoes, and their operation may be synchronised with audio and/or visual content for delivering multi-sensory stimulation.

There is a continuous need to find new ways to deliver haptic stimulation where it is needed and/or to reduce the form factor of transducers, while maintaining a suitable degree of stimulation and comfort, particularly when they are used in handheld, portable or wearable devices where available real-estate for housing the transducer(s) is limited.

SUMMARY OF THE INVENTION

It is an object of the present invention to provide alternative haptic transducers, and associated devices, apparatuses, systems, or methods, that at least provide the public with a useful choice.

In an aspect, the invention may broadly be said to consist of a haptic transducer comprising:

- a first member operatively coupled and reciprocally movable relative to a second member in response to electronic signals, and
- a substantially compliant member maintains substantially constant contact with both the first member and the second member in-use.

In an embodiment, the first member and the second member are configured to reciprocally move relative to one another along a substantially linear axis.

In an embodiment, the haptics transducer member comprises a depth dimension that is substantially parallel to an axis of linear motion between the first and second members, that is less than one or both other orthogonal dimensions of the haptics transducer. The maximum depth of the transducer may be less than approximately 0.75 times, or more preferably less than approximately 0.5 times, one or both other orthogonal dimension(s). The maximum depth may be less than approximately 18 mm, or more preferably less than approximately 9 mm, or most preferably less than approximately 6 mm.

In an embodiment, the compliant member is rigidly coupled to one or both of the first and second members, e.g., adhered or welded to one or both of the first and second members.

In an embodiment, the substantially compliant member is coupled to and between the first and second member.

In an embodiment, the first member remains in substantially constant contact with the compliant member at least at a sub-region of a side of said first member that faces the second member.

In an embodiment, the second member remains in substantially constant contact with the compliant member at least at a sub-region of a side of said second member that faces the first member.

In an embodiment, the first member is movable between a first and second terminal positions relative to the second members, and wherein the compliant member remains substantially in contact with the first member and to the second member at both the first and second terminal positions.

In an embodiment, the first member comprises a first perimeter extending substantially about a linear axis defining the axis of motion between the first and second member, the second member comprises a second perimeter extending substantially about the linear axis, and wherein the compliant member locates substantially wholly within: the first perimeter, or the second perimeter, or both. Preferably the compliant member locates substantially wholly within the first perimeter and the second perimeter.

In an embodiment, the compliant member is substantially resilient. Preferably the compliant member substantially biases the first and second members towards a first relative position.

In an embodiment, the compliant member comprises a spring.

In an embodiment, the compliant member comprises an elastomer, such as a Silicone or a Urethane material.

In an embodiment, the compliant member experiences compression and tension forces in use, relative to a neutral position of the compliant member and relatively moveable first and second members. In an alternative embodiment, the compliant member experiences primarily compression forces in use, relative to a neutral (compressed) position of the compliant member and relatively moveable first and second members.

In an embodiment, the compliant member comprises a soft plastics material, such as Silicone or TPU.

In an embodiment, the compliant member may comprise a foamed material, such as a foamed Silicone or foamed Urethane. In an embodiment, the compliant member may comprise an open-cell foamed material.

In an embodiment, the first member or the second member, or both, comprise a recess for accommodating and coupling a corresponding end of the compliant member.

In an embodiment, the haptics transducer may comprise multiple compliant members coupled between the first and second members. The multiple compliant members may comprise varying compliance levels. The multiple compliant members may all be wholly contained within a periphery the transducer about the axis of relative motion between the first and second members.

In an embodiment, the first member is substantially solid.

In an embodiment, the first member comprises a substantially rectangular perimeter surrounding a linear axis of relative motion between the first member and the second member.

In an embodiment, the first member comprises a substantially uniform cross-section along dimensions that are substantially perpendicular to a linear axis of relative motion between the first member and the second member.

In an embodiment, the first member comprises a magnetic body. The magnetic body may be a magnet. The magnet may comprise a permanent magnet. The opposing magnetic poles of the magnetic body may locate at either end of an axis of the body that is substantially perpendicular to a linear axis of relative motion between the first and second members. For example, the poles may be at either end of a longitudinal axis of the magnetic body, or alternatively at either end of a transverse axis of the magnetic body.

In an embodiment, the first member comprises multiple magnetic bodies. Two adjacent magnetic bodies may be coupled to one another via a coupling. The coupling may allow relative movement between the magnetic bodies. The coupling may allow rotational motion between the magnetic bodies about an axis that is substantially perpendicular to a linear axis of relative motion between the first and second members. The coupling may substantially inhibit substantially purely translational motion between the corresponding adjacent magnetic bodies. The coupling may substantially inhibit translational motion along an axis or axes that are substantially perpendicular to the linear axis of relative motion.

In an embodiment, the first member comprises multiple magnetic bodies. Each magnetic body may be a permanent magnet. Preferably, the magnetic bodies are spaced. The first member may further comprise a substantially rigid plate coupled to two or more magnetic bodies. There may be a pair of adjacent magnetic bodies and the substantially rigid plate is coupled to and extending between the pair of magnetic bodies. The substantially rigid plate may be coupled to an opposing side of the corresponding magnetic bodies to the second member. The substantially rigid plate may be formed from a ferromagnetic material, such as ferromagnetic metals material. The substantially rigid plate may form a recess for receiving and retaining the substantially compliant member. The recess may be between two adjacent magnetic bodies of the first member. In some embodiments, a recess may also be formed in the second member for receiving and retaining the compliant member.

In an embodiment, the first member comprises multiple magnetic bodies. A first pair of adjacent magnetic bodies may comprise opposite magnetic pole configurations. The magnetic poles of each magnetic body may be on opposing ends of an axis that is substantially parallel to an axis of linear relative motion between the first and second members. Alternatively, the poles are on opposing ends of a transverse axis that is substantially perpendicular to the axis of linear relative motion.

In an embodiment, the first member comprises a magnet. In an embodiment the first member comprises multiple magnets. The magnet or magnets may comprise permanent magnet(s). Alternatively, or in addition, the magnet or magnets may comprise electromagnet(s). The first member may further comprise at least one magnetic plate that is not a magnet and coupled between two or more adjacent permanent magnets. The adjacent magnets are preferably fixedly coupled relative to one another.

In an embodiment, the first member may comprise a pair of adjacent magnets at an outer periphery of the first member, and a central plate extending centrally between and connecting the magnets. The plate is preferably a ferromagnetic plate. The magnets preferably comprise permanent magnets.

In an embodiment, the first member comprises a magnetic plate that is not a magnet configured to magnetically interact with the second member during operation. The first member may not comprise any magnets. A magnetism exhibited by the magnetic plate of the first member may primarily be a result of current through the second member, in use.

In an embodiment, the first member and second members exhibit an attraction force, in use, regardless of direction of electrical current through the second member.

In an embodiment, the first member is substantially linear. The first member may be substantially elongate. The first member may comprise a single magnetic body. Alternatively, the first member may comprise multiple magnetic bodies.

In an embodiment, the first member is substantially curved. The first member may comprise a single magnetic body. Alternatively, the first member may comprise multiple magnetic bodies. The first member may comprise a substantially annular and closed periphery. The first member may comprise opposing magnetic poles, with a first magnetic pole at an inner region or radius of the first member, and the second magnetic pole at an outer region or radius of the first member.

In an embodiment, the first member is moveable during operation. A total mass of the first member comprises at least approximately 50% of a body or bodies that operatively couple the second member to generate movement of the first member, more preferably at least approximately 65% and most preferably at least approximately 80%. The body or bodies may comprise any combination of one or more of permanent magnets, ferromagnetic bodies and/or electromagnetic bodies.

In an embodiment, the haptics transducer comprises less than 4 permanent magnets, more preferably less than 3 permanent magnets.

In an embodiment, the first member is substantially thin along a dimension that is substantially parallel to an axis of relative linear motion between the first and second members. For example, a maximum thickness of the first member may be less than approximately 0.5 times, more preferably less than approximately one third, and most preferably less than approximately 0.25, of at least one other dimension that is substantially orthogonal to the thickness dimension. The other dimension may be the width and/or length dimension(s) for instance. The maximum thickness may be less than approximately 6 mm, more preferably less than approximately 3 mm and most preferably less than approximately 2 mm.

In an embodiment, the first member comprises a substantially small depth along a dimension that is substantially parallel to an axis of relative linear motion between the first and second members, relative to other orthogonal dimensions of the first member. For example, a maximum depth of the second member may be less than approximately 0.5 times, more preferably less than approximately one third, and most preferably less than approximately 0.25, of at least one other dimension that is substantially orthogonal to the depth dimension. The other dimension may be the width and/or length dimension(s) for instance. The maximum depth may be less than approximately 6 mm, more preferably less than approximately 3 mm and most preferably less than approximately 2 mm.

In an embodiment, the first member is substantially elongate wherein a maximum width along a transverse axis is less than approximately 0.8 times a maximum length along a longitudinal axis of the first member, more preferably less than approximately 0.6 times the maximum length, and most preferably less than approximately 0.4 times the maximum length. An axis intersecting the opposing north and south poles of the first member may be substantially parallel to the transverse axis.

In an embodiment, the first member is operatively coupled and reciprocally movable along a linear axis relative to the second member in response to electronic signals received by the second member, and the first member comprises a first magnetic plate with an induced magnetic field that is oriented substantially perpendicular to the linear axis. The first magnetic plate may be a ferromagnetic plate.

In an embodiment, the second member is substantially solid.

In an embodiment, the second member comprises a substantially rectangular perimeter surrounding a linear axis of relative motion between the first member and the second member.

In an embodiment, the second member comprises a substantially uniform cross-section along dimensions that are substantially perpendicular to a linear axis of relative motion between the first member and the second member.

In an embodiment, the second member comprises an electromagnet. The electromagnet may comprise a coil. The coil may be wound about an axis that is substantially perpendicular to the axis of relative linear motion between the first and second members. In other words, the first and second members are magnetically cooperative such that a direction of relative motion is substantially perpendicular to the axis about which the coil is wound. For example, the coil may be wound about a transverse axis of the second member, or a longitudinal axis of the second member. The coil is configured to generate magnetic poles that are substantially aligned with magnetic poles of the first member, along an axis that is substantially parallel to an axis of linear relative motion between the first and second members. The electromagnet may comprise a former and a coil wound about the former. The former may be a ferromagnetic material, such as a ferromagnetic metals material, e.g., steel or iron. The former is not formed from a permanent-magnet body or material. The coil may be rigidly coupled to the former. The coil may be bonded to the former via a suitable adhesive.

In an embodiment, the second member comprises multiple magnetic bodies. The magnetic bodies may be electromagnetic bodies. Two adjacent magnetic bodies may be coupled to one another via a coupling. The coupling may allow relative movement between the magnetic bodies. The coupling may allow rotational motion between the magnetic bodies about an axis that is substantially perpendicular to a linear axis of relative motion between the first and second members. The coupling may substantially inhibit substantially pure translational motion between the corresponding adjacent magnetic bodies. The coupling may substantially inhibit translational motion along an axis or axes that are substantially perpendicular to the linear axis of relative motion.

In an embodiment, the second member comprises multiple magnetic bodies. The magnetic bodies may be electromagnetic bodies.

In an embodiment, the second member comprises a complementary shape to the first member. The second member may be formed from a single magnetic body and the first member may be formed from a complementary single magnetic body. Alternatively, the second member may be formed from a single magnetic body that complements multiple magnetic bodies of the first member. In yet another alternative, the second member may be formed from multiple magnetic bodies that complement multiple magnetic bodies of the first member.

In an embodiment, the second member may be substantially elongate.

In an embodiment, the second member is substantially curved. The second member may comprise a substantially annular and closed periphery.

In an embodiment, the second member may comprise a coil with an inner periphery that is wound about an inner former. The second member may comprise a wall extending about an outer periphery of the coil. The second member may comprise a plate with a recess for accommodating the coil.

In an embodiment, the second member may comprise a coil wound about a former and wherein the former extends laterally beyond at least one end of the coil along an axis that the coil is wound about. More preferably the former extends beyond both ends of the coil along the axis.

In an embodiment, the first member moves during operation and the second member is substantially stationary. In another embodiment, the second member moves during operation and the first member is substantially stationary.

In an embodiment, the first member comprises a first ferromagnetic plate and the second member comprises a second ferromagnetic plate, wherein the first and second ferromagnetic plates are substantially parallel during operation.

In an embodiment, the second member is substantially thin along a dimension that is substantially parallel to an axis of relative linear motion between the first and second members. For example, a maximum thickness of the second member may be less than approximately 0.5 times, more preferably less than approximately one third, and most preferably less than approximately 0.25, of at least one other dimension that is substantially orthogonal to the thickness dimension. The other dimension may be the width and/or length dimension(s) for instance. The maximum thickness may be less than approximately 6 mm, more preferably less than approximately 3 mm and most preferably less than approximately 2 mm.

In an embodiment, the second member comprises a substantially small depth along a dimension that is substantially parallel to an axis of relative linear motion between the first and second members, relative to other orthogonal dimensions of the second member. For example, a maximum depth of the second member may be less than approximately 0.5 times, more preferably less than approximately one third, and most preferably less than approximately 0.25, of at least one other dimension that is substantially orthogonal to the depth dimension. The other dimension may be the width and/or length dimension(s) for instance. The maximum depth may be less than approximately 6 mm, more preferably less than approximately 3 mm and most preferably less than approximately 2 mm.

In an embodiment, the second member is substantially elongate wherein a maximum width along a transverse axis is less than approximately 0.8 times a maximum length along a longitudinal axis of the second member, more preferably less than approximately 0.6 times the maximum length, and most preferably less than approximately 0.4 times the maximum length. The axis about which the coil is wound may be substantially parallel to the transverse axis.

In an embodiment, the second member extends beyond the first member along an axis that a coil of the second member is wound about. The second member extends beyond the first member at least one end, and preferably at both opposing ends of the second member along the axis about which the coil is wound.

In an embodiment, the first and second members are configured to maintain substantially parallel alignment between first and second terminal positions of a full range of motion, during operation.

In an embodiment, the first member is operatively coupled and reciprocally movable along a linear axis relative to the second member in response to electronic signals received by the second member, wherein the second member comprises a magnetic plate and an induced magnetic field in the magnetic plate is substantially perpendicular to the linear axis. The magnetic field may be generated by the first member. A magnetic field that is substantially perpendicular to the linear axis is induced when no electronic signals are received by the second member and/or at a neutral relative position between the first and second members. The magnetic plate may be a ferromagnetic plate.

In an embodiment, the haptics transducer comprises a fundamental resonance frequency, in terms of movement of the first member relative to the second member, of at least approximately 100 Hz, more preferably at least approximately 150Hz, and most preferably at least approximately 200Hz in situ.

In an embodiment, a higher cut-off frequency of a frequency range of operation of the haptics transducer is at or below approximately 500 Hz, more preferably at or below approximately 300 Hz and most preferably at or below 200 Hz, the higher cut-off frequency being defined by a −6 dB point of a frequency response of haptics transducer.

In an embodiment, greater than approximately 50% of a frequency range of operation of the haptics transducer, measured in octaves, is above a fundamental resonance frequency, in terms of movement of the first member relative to the second member in-situ and during operation, more preferably greater than approximately 60% and most preferably greater than approximately 70%.

In an embodiment, the haptics transducer further comprises a communications device configured to receive electronic signals for driving the haptics transducer. Preferably the communications device is a wireless communications device configured to receive electronic signals wirelessly.

In an embodiment, the haptics transducer further comprises a processing device configured to receive a source signal and generate a haptics signal for driving the haptics transducer. The source signal may be an audio signal. The processing device may be configured to generate an audio drive signal for driving an audio transducer associated with the haptics transducer. The processing device may be configured to apply a low-pass filter to the source signal to generate the haptics signal. The signal processing component may convert one or more frequencies of the source signal to one or more other target frequencies at which haptics transducer effectiveness is increased. The signal processing component may compress the source signal.

In an embodiment, a signal processing device of the haptics transducer may be configured to operate to perform any one or more of the following functions to a source drive signal:

- frequencies are halved, to compensate for the fact that frequencies are doubled in the transducer;
- a DC offset is applied to drive signal for transducer, so that the haptic drive current never changes phase/passes the zero amps point;
- a source haptic signal is monitored, and DC signal is applied mainly when a source haptic signal is non-zero;
- a source haptic signal is monitored, and sufficient DC signal is applied so that the haptic drive current never changes phase/passes the zero amps point;
- the source signal is monitored ahead of time so that DC offset can be ramped up in time to properly replicate haptic source signal;
- source signal is not monitored ahead of time, and is ramped up relatively quickly when a source haptic signal is detected in order to minimise missing haptic output at the start of transients; and/or
- phase of initial haptics transients is detected, and phase may be reversed in order to permit haptic actuation to commence immediately. Preferably a DC offset is ramped up at the same time to permit accurate reproduction of later parts of haptic source signal.

Any one or more of the embodiments above may be combined with one another, unless there is a clear contradiction of features, as would be readily apparent to the person skilled in the art.

In another aspect, the invention may broadly be said to consist of a haptic transducer comprising:

- a first member operatively coupled and reciprocally movable along a linear axis relative to a second member in response to electronic signals received by the second member, the first member having a first magnetic plate with an induced magnetic field that is oriented substantially perpendicular to the linear axis.

In an embodiment, a magnetic field that is substantially perpendicular to the linear axis is induced when no electronic signals are received by the second member and/or at a neutral relative position between the first and second members.

In an embodiment, the second member comprises a second magnetic plate and an induced magnetic field in the second plate is substantially perpendicular to the linear axis. Preferably, a magnetic field that is substantially perpendicular to the linear axis is induced when no electronic signals are received by the second member and/or at a neutral relative position between the first and second members.

In another aspect, the invention may broadly be said to a haptic transducer comprising:

- a first member capable of exhibiting a magnetic force in proximity of a magnetic field;
- a second member including a coil, the coil being configured to generate a magnetic field encompassing or proximal to the first member when an electrical signal is received by the coil;
- wherein the first and second members are compliantly coupled to enable relative reciprocal movement between the first and second members along a substantially linear axis, and
- wherein the coil is wound about an axis oriented substantially perpendicular to substantially linear axis.

In another aspect, the invention may broadly be said to be a haptic transducer comprising:

- a first member being predominantly formed of a non-permanent magnetic material;
- a second member having a coil, the coil being configured to generate a magnetic field encompassing or proximal to the first member when an electrical signal is received by the coil to move the first member in response to the electrical signal,
- wherein the magnetism exhibited by the non-permanent magnetic material of the first member is primarily a result of current through the coil, in use.

In another aspect, the invention may broadly be said to be a haptic transducer comprising:

- a first member comprising a non-permanent magnetic material;
- a second member having a coil, the coil being configured to generate a magnetic field encompassing or proximal to the first member when an electrical signal is received by the coil to move the first member in response to the electrical signal,
- wherein the magnetism exhibited by the non-permanent magnetic material of the first member is primarily a result of current through the coil.

In another aspect, the invention may broadly be said to a haptic transducer comprising:

- a first member comprising a non-permanent magnetic material;
- a second member having a coil, the coil being located proximal to the first member and configured to generate a magnetic field encompassing or proximal to the first member when an electrical signal is received by the coil to move the first member in response to the electrical signal,
- wherein the first member and second members exhibit an attraction force, in use, regardless of direction of electrical current in the coil.

In another aspect, the invention may broadly be said to consist of a haptic transducer comprising:

- a first member capable of exhibiting a magnetic force in proximity of a magnetic field;
- a second member having a coil wound about a ferromagnetic core, the coil being located proximal to the first member and configured to generate a magnetic field encompassing or proximal to the first member when an electrical signal is received by the coil.

In another aspect, the invention may broadly be said to consist of a haptic transducer comprising:

- a first member operatively coupled to and moveable relative to a second member to generate haptic feedback;
- wherein the first member comprises a plurality of bodies moveably coupled to one another.

In another aspect, the invention may broadly be said to consist of a haptic transducer comprising:

- a first member operatively coupled and reciprocally movable relative to a second member in response to electronic signals, and
- a compliant member connects between the first member and the second member, wherein an entirety of an outer periphery of the compliant member extends substantially within or is substantially contained within an outer periphery or boundary of the first member, about an axis of movement of the first member relative to the second member.

In another aspect, the invention may broadly be said to consist of a haptic transducer comprising:

- a first member operatively coupled and reciprocally movable relative to a second member in response to electronic signals, and
- a compliant member connects between the first member and the second member, wherein a majority of an outer periphery of the compliant member extends substantially within or is substantially contained within an outer periphery or boundary of the first member, about an axis of movement of the first member relative to the second member.

Any one or more of the abovementioned embodiments relating to the first haptics transducer aspect may be combined with any one or more of the other haptics transducer aspects stated above.

In another aspect, the invention may broadly be said to consist of a wearable or handheld device or apparatus comprising:

- a base,
- a substantially compliant layer of padding coupled to the base for providing comfort to the user, and
- a haptics transducer within the layer of padding.

In an embodiment, the haptics transducer comprises a first member operatively coupled and reciprocally movable relative to a second member in response to electronic signal. Preferably, the haptics transducer further comprises a substantially compliant member between the first member and the second member.

The haptics transducer may consist of any one of the haptics transducers of the previous aspects or of any one of the associated haptics transducer embodiments.

In an embodiment, the base is substantially incompressible relative to the substantially compliant layer.

In an embodiment, the base is substantially rigid.

In an embodiment, a majority of the first member of the transducer is contained within the layer of padding. Preferably, the first member is substantially wholly contained within the padding layer. Preferably, first movable is substantially wholly contained within a single padding layer.

In an embodiment, a face of the first member most proximal to the second member is substantially flush with or entirely contained within the padding layer.

In an embodiment, a majority of the second member is embedded within a second substantially compliant layer of padding of the device or apparatus and coupled to the base. The first and second compliant layers of padding may be substantially adjacent to one another and the haptics transducer may extend across both layers. Alternatively, the first and second compliant layers of padding may be substantially spaced by a third or more intermediate layer(s) of padding and the haptics transducer may extend across all intermediate layer(s).

In an embodiment, the first member is located proximal to a surface of the device or apparatus configured to engage a user in use, and the second member is located substantially distal to the surface relative to the first member.

In an embodiment, the device or apparatus comprises a compliant padding layer between the first member and a surface of the device or apparatus configured to engage a user in use.

In an embodiment, the device or apparatus is configured to locate against a user's head in use. For example, the device may be a headphone or headphone cup.

In an embodiment, the device further comprises an audio transducer. For example, the device may be a headphone or headphone cup.

In an embodiment, the device or apparatus is footwear, such as a shoe.

In an embodiment, the padding layer comprises an open cell foam material. Preferably the foam is substantially flexible, such as a Urethane or a TPU material.

In an embodiment, the padding layer is substantially compliant to conform to soft, non-load-bearing parts of a user's body in use.

In an embodiment, the padding layer comprises a thickness of approximately more than 3 mm, more preferably more than approximately 5 mm and most preferably more than approximately 8 mm, along an axis that is substantially parallel to an axis of linear motion of the haptics transducer.

In an embodiment, the padding layer comprises a density of less than approximately 20 $kg/m^3$, more preferably a density of less than approximately 30 $kg/m^3$, and most preferably a density of less than approximately 40 $kg/m^3$.

In an embodiment, the padding layer compresses more than approximately 25% within approximately 5 minutes, with applied pressure of approximately 300 $kg/m^2$, more preferably applied pressure of approximately 500 $kg/m^2$, and most preferably applied pressure of approximately 800 $kg/m^2$. The padding layer may exhibit this compressibility over a significant thickness of the padding layer, such as over a thickness of more than approximately 3 mm, more preferably more than approximately 5 mm and most preferably more than approximately 8 mm.

In an embodiment, the device or apparatus further comprises a substantially thin cover coupled over the padding layer. The thin cover may be less than approximately 1 mm thick, more preferably less than approximately 0.5 mm and most preferably less than approximately 0.3 mm thick. Preferably the cover is substantially flexible. The cover may be a fabrics layer coupled to the padding layer. The cover may comprise a textile, leather, or faux leather fabrics layer for example.

In an embodiment, an overall compliance, per unit area of a connection between a first member and a second member of the haptics transducer is substantially the same or lower than a compliance, per unit area between a wearer's bones and the first member, in use.

In an embodiment, the fundamental resonance frequency, in Hertz, of the first member moving in relation to the second member changes by less than 30%, more preferably less than 20% and most preferably less than 15% when a user is wearing the device in a most-common use scenario, versus when the device is not being worn.

In an embodiment, the haptics transducer comprises a first member that is substantially moveable during operation and a second member that is substantially stationary during operation, wherein the first member proximal to a user in situ, relative to the second member.

In an embodiment, an overall compliance of the device exhibited by a user in a region of the haptics transducer in use is substantially the same or similar to an overall compliance exhibited by a user in regions that surround the transducer. Preferably the compliance is measured along an axis that is substantially parallel to an axis of linear motion of the transducer.

In an embodiment, the haptics transducer comprises a first and second members, moveable relative to one another to generate haptics feedback, wherein a second member of the transducer that is stationary during operation is coupled to the base of the device or apparatus. In an embodiment the base is a headphone earcup frame. In an alternative embodiment the base is a shoe outsole. The second member may be directly and fixedly coupled to the base. Alternatively, the second member may be coupled via a compliant layer, such as an open cell foam padding layer. The second member may be substantially decoupled from the base to substantially alleviate or mitigate the transfer of mechanical forces from the second member to the base during operation.

In an embodiment, the haptics transducer comprises first and second members moveable relative to one another in response to received electrical haptics signals, and wherein the second member comprises a coil for receiving the electrical haptics signals, the coil being wound about an axis that is substantially parallel to a surface of the device or apparatus configured to apply haptics feedback to a user in use. Preferably the surface provides a highest haptics feedback force to a user in use.

In an embodiment the device or apparatus further comprises a signal processing component configured to receive a source electrical signal and process the source signal to generate a haptics signal for driving the haptics transducer. The source signal may be an audio signal for driving an audio transducer of the device or apparatus. The signal processing device may filter low frequency components of the source signal to generate the haptics signal. The signal processing component may convert one or more frequencies of the source signal to one or more other target frequencies at which haptics transducer effectiveness is increased. The signal processing component may compress the source signal.

In an embodiments one or more haptic signals may be generated and transmitted to the haptic transducers of any one of the above aspects, and the haptic signal may be generated and/or modified using one or more on-board or external signal processors. The signal processor(s) may be configured to operate to perform any one or more of the following functions:

- frequencies are halved, to compensate for the fact that frequencies are doubled in the transducer;
- a DC offset is applied to drive signal for transducer, so that the haptic drive current never changes phase/passes the zero amps point;
- a source signal is monitored, and DC signal is applied only when source haptic signal is non-zero;
- a source signal is monitored, and DC signal is applied so that the haptic drive current never changes phase/passes the zero amps point;
- the source signal is monitored ahead of time so that DC offset can be ramped up in time to properly replicate haptic source signal;
- source signal is not monitored ahead of time, and is ramped up relatively quickly when a source haptic signal is detected in order to minimise missing haptic output at the start of transients; and/or
- phase of initial haptics transients is detected, and phase may be reversed in order to permit haptic actuation to commence immediately. Preferably a DC offset is ramped up at the same time to permit accurate reproduction of later parts of haptic source signal.

Any one or more of the embodiments above may be combined with one another, unless there is a clear contradiction of features, as would be readily apparent to the person skilled in the art.

In another aspect, the invention may broadly be said to consist of a wearable or handheld device or apparatus comprising:

- a base,
- a substantially compliant layer of padding coupled to the base for providing comfort to a user, in use,
- a haptic transducer having a first member reciprocally movable in response to received electronic haptic signals, for stimulating nerve receptors in an area of a user's body adjacent the device in use,
- wherein a majority of the first movable member is incorporated within the padding layer.

In another aspect, the invention may broadly be said to consist of a wearable or handheld device comprising:

- a haptic transducer capable of supporting loads generated by a user in situ.

In one aspect, the invention may broadly be said to consist of a wearable or handheld device comprising:

- a substantially rigid base,
- a haptic transducer having:
  - a first member reciprocally movable relative to the base in response to received electronic haptic signals, for stimulating nerve receptors in an area of a user's body adjacent the device in use,
  - a second member configured to magnetically interact with the first member to move the first member during operation:
  - wherein the both first and second members are substantially decoupled from the rigid base substantially alleviate movement or displacement of the rigid base during operation of the transducer.

In some embodiments, the device further comprises an audio transducer.

In another aspect, the invention may broadly be said to consist of an apparatus, comprising:

a base, a haptic transducer having a first member operatively coupled and reciprocally movable relative to a second member in response to electronic signals, one of said members being closer to the base, and a substantially compliant support of padding coupled between the member of the transducer closer to the base and the base.

In another aspect, the invention may broadly be said to consist of an apparatus, comprising:

a base, a haptic transducer having a first member operatively coupled and reciprocally movable relative to a second member in response to electronic signals, one of said members being closer to the base, and a substantially compliant member of padding coupled between the member of the transducer closer to the base and the base;

wherein an outer periphery of the compliant member does not extend beyond an outer periphery of the member closer to the base, about an axis of movement of the first member relative to the second member.

In some embodiments, the first member is movable between a first and second terminal positions relative to the second member, and wherein the compliant member connects to the first member and second member at both the first and second terminal positions.

In another aspect, the invention may broadly be said to consist of a wearable or handheld device, comprising:

a base, a padding formed from a substantially compliant material coupled to the base layer for providing comfort to a user, in use, a haptic transducer coupled to the padding layer and having a first member reciprocally movable in response to received electronic haptic signals, for stimulating nerve receptors in an area of a wearer's body adjacent the wearable device in use, wherein a majority of the first movable member is incorporated within the padding layer, and wherein an average compliance per unit area, of a first region of the padding layer including the compliant material and the first movable member is substantially similar to an average compliance per unit area of a second region of the padding layer absent the padding layer.

In some embodiment, the first movable member is substantially wholly contained within the padding layer. Preferably, first movable member is substantially wholly contained within a single padding layer.

In some embodiments, the transducer further comprises a second member operatively coupled to the first member to move the first member relative thereto during operation. Preferably, a face of the first moveable member most proximal to the second member is substantially flush with or entirely contained within the padding layer.

In some embodiments, the device further comprises an audio transducer.

In another aspect, the invention may broadly be said to consist of a wearable or handheld device, comprising:

a body configured to locate against a user's body in use;

a haptic transducer incorporated within the body and having a first member operatively coupled and reciprocally movable relative to a second member in response to electronic signals, the first and second members being located within the body such that one of said first and second members locates closer to the user's body in use, and wherein the first or second member that locates closer to the user's body in use, is substantially planar.

In another aspect, the invention may broadly be said to consist of a wearable or handheld device comprising:

a body configured to locate against a user's body in use, and a haptic transducer incorporated within the body and having:

a first member capable of exhibiting a magnetic force in proximity of a magnetic field;

a second member including a coil, the coil being configured to generate a magnetic field encompassing or proximal to the first member when an electrical signal is received by the coil;

wherein the first and second members are compliantly coupled to enable relative reciprocal movement between the first and second members, and wherein the coil is wound about an axis oriented substantially parallel to a surface of the body configured to locate adjacent a user's body when worn.

Any one or more of the abovementioned embodiments may be combined with any one or more of the device or apparatus aspects stated above.

In another aspect, any one of the abovementioned transducer devices or apparatuses incorporating a transducer may be utilised within or in conjunction with an audio and/or visual system, and transducer operation may be controlled based on the requirements of the audio and/or visual system, for instance, in synchronicity with audio and/or visual signals of the system.

Any one of the abovementioned aspects, may be combined with any one or more the features described in the detailed description section of this specification without departing from the scope of the invention.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

NUMBER RANGES

It is intended that reference to a range of numbers disclosed herein (for example, 1 to 10) also incorporates reference to all rational or irrational numbers within that range (for example, 1, 1.1, 2, 3, 3.9, 4, 5, 6, 6.5, 7, 8, 9 and 10) and also any range of rational or irrational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The invention consists in the foregoing and also envisages constructions of which the following gives examples only. Further aspects and advantages of the present invention will become apparent from the ensuing description.

BRIEF DESCRIPTION OF THE DRAWINGS

Preferred embodiments of the invention will be described by way of example only and with reference to the drawings, in which.

DETAILED DESCRIPTION OF EMBODIMENTS

Figure 1A:
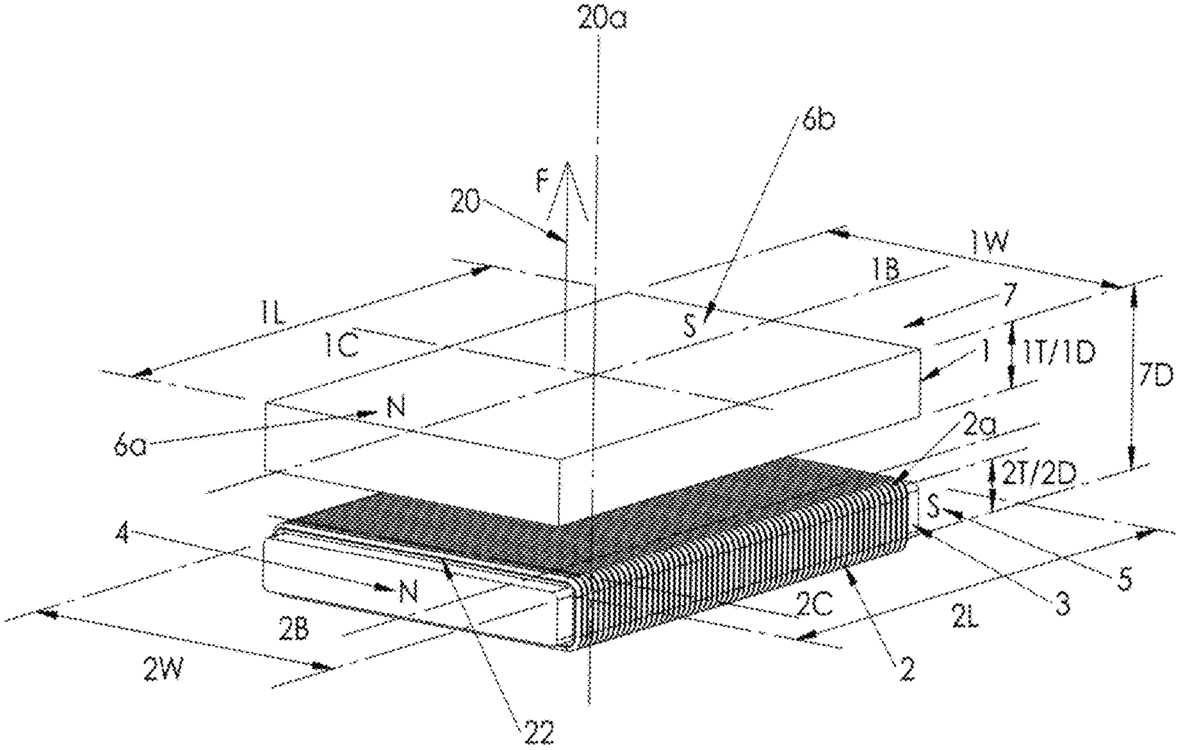
FIG. 1A is a first haptic transducer embodiment of the invention.

Referring to FIG. 1A, a first embodiment of a haptic transducer 7 of the invention is shown comprising first and second magnetic members 1, 2 configured to move relative to one another in response to received electronic haptic signals. The haptic transducer 7 is designed to reproduce vibration and in preferred implementation it is to be incorporated into wearable or handheld and/or portable products such as shoes, headphones, mobile phones, gloves, and the like. Accordingly, the transducer 7 can be designed with a relatively small form factor making it particularly suited for wearable and/or handled/portable applications.

In the embodiments described herein, reproduction of vibration is achieved by having at least two magnetic members, that are configured to magnetically interact and move relative to one another in response received electronic signals, by one or both members. The members are designed such that a varying current received by one or both members cause a corresponding variable movement between the members. For instance, an alternating current of a particular frequency may cause the members to reciprocally move toward and away from one another at a same, similar, or corresponding frequency.

At least one of the members 1, 2 comprises a magnet, and the other member 1, 2 comprises a magnet and/or a magnetic body. In this embodiment, at least one magnetic member 1, 2 comprises an electromagnet that is capable of receiving a current and that generates a corresponding magnetic field in response to the received current. In other words, at least one magnetic member 1, 2 has a varying magnetic field that is dependent on electronic signals received by the member 1, 2. The other magnetic member 1, 2 comprises a magnet or a magnetic body formed of a magnetic material that is capable of being magnetised and influenced by a magnetic field created by the electromagnet, such as a ferromagnetic body. In this embodiment, the second member 2 comprises an electromagnet and the first member 1 comprises a permanent magnet.

The electromagnet comprises at least a coil 2*a* that is configured to receive an electric current and generate a magnetic field in response to the current. The coil 2*a* may also be wound about a core 3 (herein also referred to as a former), which may be formed form a ferromagnetic material, to direct the magnetic field thereby improving effective magnetic field strength and/or improving the overall cost-effectiveness of the transducer 7. The ferromagnetic material may be iron or steel, for instance. The coil 2*a* may be rigidly coupled to the ferromagnetic core 3.

In this specification, unless stated otherwise, a magnetic body or magnetic member is intended to mean a body or member that comprises a magnet, or a body or member that is capable of being magnetised and exhibits a substantial degree of magnetism in response to an applied magnetic field. The latter may include bodies or members comprising ferromagnetic, ferrimagnetic and paramagnetic materials, for instance. Preferably, a ferromagnetic material is used in the case of where a magnetic body is utilised for one of the members. A magnet is intended to mean an object that is intended or capable of generating a magnetic field, such as a permanent magnet or an electromagnet.

In all other embodiments described herein, and unless stated otherwise, where one of the haptic transducer embodiments may be incorporated in a wearable or handheld device or apparatus, the first magnetic member 1 is the member intended to be embedded within the wearable or handheld device closer to the wearer or user, in use, and the second member 2 is configured to be relatively more distal to the wearer or user, in use.

The magnetic poles of the first and second members 1 and 2 are preferably aligned during operation to maximise their interaction. For instance, the terminal ends of the coil 2*a* and/or core 3, where magnetic poles are exhibited when current flows through the coil 2*a* may be aligned and in close proximity with corresponding ends of the magnet 1 where the north and south poles are exhibited. The alignment is preferably relative to axes that are substantially parallel to an axis of relative linear motion 20A of the first and second members 1, 2 during operation. The first and second members are configured to maintain substantially parallel alignment between first and second terminal positions of a full range of motion, during operation.

In this first embodiment, the first magnetic member 1 of the transducer 7 comprises a permanent magnet, formed from a magnetic material such as neodymium. Alternatively, this may be an electromagnet, or other non-permanent-magnet magnetic body as described above. In some embodiments, if the first member 1 comprises a magnet (e.g., a permanent magnet or electromagnet) it may optionally have a ferromagnetic material rigidly attached thereto to direct the magnetic field, thereby improving effective magnetic field strength and/or improving the overall cost-effectiveness of the transducer 7, while reducing the size and/or mass of the magnet. The first member 1 may also be referred to as magnet 1, with reference to this and other embodiments for the sake of clarity. However, it will be appreciated that this is just exemplary and not intended to be limiting as described above.

The permanent magnet 1 of this embodiment has permanent north and south poles 6*a* and 6*b* respectively. The poles are shown in a certain configuration in the drawings, but this may be reversed in some embodiments. The magnet 1 is preferably a planar component. The magnet 1 may have a flattened profile and be formed into a relatively thin plate, for instance. The magnet 1 may comprise a substantially uniform cross-sectional profile across at least one, or two, of the major dimensions of the magnet. For instance, the magnet 1 may comprise a substantially uniform thickness, 1T, and depth, 1D, across the length, 1L, or width, 1W, of the magnet 1, or both. The poles 6*a* and 6*b* are on opposing sides of the major faces of the first part 1. In this embodiment, the poles 6*a* and 6*b* are on opposing sides of an imaginary plane bisecting a major face or faces of the magnet 1. In other words, the poles 6*a* and 6*b* may be located on opposing ends of the magnet 1 along an axis that is substantially perpendicular to the axis of linear motion 20A, such as longitudinal axis 1B or transverse axis 1C of the magnet 1. In this example the poles 6*a* and 6*b* are shown at opposing ends of the longitudinal axis 1A of magnet 1.

The second magnetic member 2 comprises an electromagnet having a coil 2*a* wound about a core 3. The coil 2*a* is configured to receive electronic haptic signals and to generate a varying magnetic field in response to the signals. The second member 2 may also be referred to as electromagnet 2, with reference to this and other embodiments. However, it will be appreciated that this is just exemplary and not intended to be limiting. The electromagnet 2 may not include a core 3 in some configurations, or it may include a core that is not ferromagnetic or magnetic but is intended to provide additional strength to member 2. Such configurations may be advantageous in cases where a steady state attraction between first member 1 and second member 2, such as may occur between a magnet and a ferromagnetic body. The electromagnet 2 is positioned proximal to the magnet 1, and the electromagnet 2 and magnet 1 are movably coupled relative to one another so they may create vibrations in response to electronic signals received by the coil 2*a*. The magnet 1 and electromagnet 2 are preferably in relatively close proximity over a significant area in order to maximise their interaction during operation.

The coil 2*a* is preferably wound about a core 3 formed of a ferromagnetic material in order to enhance its electromagnetic field. Preferably core 3 is rigidly attached to coil 2*a*. Preferably, the core 2*a* extends laterally beyond at least one end of the coil along an axis that the coil is wound about. More preferably the former extends beyond both ends of the coil along the axis. In some embodiments, the electromagnet 2 may only consist of a coil 2*a*. In operation, an electronic haptic signal is received by the coil 2*a* comprising a varying current (and/or voltage). This generates a magnetic field around the coil 2*a* which reciprocally attracts and repels the magnet 1, depending on the direction of current. For example, when current is passed through the coil 2*a* in direction 22 this generates north 4 and south 5 poles respectively at either end of the coil 2*a*, along longitudinal axis 2B, which in this example creates a force in direction 20 thereby repelling magnet 1 away from coil 2. In some embodiments, such repulsion may be superimposed on a steady state attraction meaning that the net effect may still be an attraction. As the direction of current from the received signal changes, this creates an opposing force on the magnet 1. This repeated cycle of current creates reciprocal relative motion between the magnet 1 and electromagnet 2 along a substantially linear axis 20A, which in turn generates a mechanical vibration corresponding to the haptic signal. Preferably coil is wound about an axis oriented substantially perpendicular to axis 20A, and more preferably substantially perpendicular to the plane bisecting the major faces so that the opposing poles generated as a result of member 2 are substantially aligned with the poles of member 1. In other words, the poles 4 and 5 may be located on opposing ends of the electromagnet 2 along an axis that is substantially perpendicular to the axis of linear motion 20A, such as longitudinal axis 2B or transverse axis 2C of the electromagnet 2. In this example the poles 4 and 5 are shown at opposing ends of the longitudinal axis 2B of electromagnet 2.

In a wearable or handheld device or apparatus implementation, the coil 2A may be wound about an axis oriented substantially parallel to a surface of a device or apparatus configured to contact the user's skin in use.

In this embodiment both the first member 1 and the second member 2 have a low profile to facilitate fitting within narrow spaces such as within the sole of a shoe, or the ear pad of a headphone cup. In embodiments where a ferromagnetic core 3 is employed within the coil 2*a* this may provide a benefit of carrying a significant magnetic field which is dispersed across a large area thereby improving force generation. Meanwhile the coil 2*a* is robustly supported, the entire transducer 7 is relatively thin, and complexity is low.

In some embodiments, the first member 1, is substantially elongate. For instance, in this embodiment, a maximum width dimension, 1W, of the member 1 may be less than the maximum length dimension, 1L, along the longitudinal axis. The width dimension, 1W, may be less than $<0.8$ of the length dimension, 1L, more preferably $<0.6$, most preferably $<0.4$ times the length dimension, 1L.

In this embodiment, the magnetic north, and south poles 6*a*, 6*b* generated by the first member 1 are located at opposing ends of the longitudinal axis 1B along length dimension 1L. In other embodiments, the magnetic north and south poles generated by the first member 1 may be located on opposing ends of a transverse axis along the width dimension 1W.

In some embodiments, the second member 2 is substantially elongate. For instance, in this embodiment, a maximum width dimension, 2W, may be less than the maximum length dimension, 2L, along the longitudinal axis. The width dimension, 2W, may be less than <0.8 of the length dimension, 2L, more preferably <0.6, most preferably <0.4 times the length dimension, 2L.

The magnetic poles the first and second members are preferably aligned with respect to axes that are substantially parallel to linear axis 20A to maximise the mechanical interaction and forces generated between the members 1 and 2 in use. This proportioning may help to increase force generated, all else being equal, by reducing the distance between the magnet poles.

In this embodiment, the coil 2*a* is wound about an axis oriented substantially parallel to the longitudinal axis 2B to generate magnetic north and south poles at either end of the longitudinal axis 2B. In other embodiments, the coil may be wound about the transverse axis 2C to generate north and south poles at either end of the transvers axis 2C to maximise interaction with a first member 1 also having magnetic north and south poles at opposing ends of the transverse axis 1C. In this embodiment, the first member 1 is relatively thin along the axis of primary movement of the members 1 and 2 relative to one another and/or along directions perpendicular to a user's skin in use, when embedded in a wearable or handheld device. Preferably, this dimension is less than half another dimension of the member 1, more preferably less than one third, and most preferably less than one quarter of the other dimension. The other dimension may be a maximum length, 1L along the longitudinal axis of the first member 1. For instance, the first member 1 comprises a maximum thickness, 1T, that is less than approximately 6 mm, more preferably less than approximately 3 mm, and most preferably less than approximately 2 mm, for a member 1 having a maximum length of more than approximately 12 mm. The thickness, 1T is preferably substantially uniform along the full length and width of the member 1. The depth is preferably substantially the same as the thickness such that the member 1 has a substantially uniform cross-section along the longitudinal axis, or transverse axis, or preferably along both.

In this specification, the depth of a member refers to the total distance between topmost and lowermost surfaces of the member, along the thickness axis, e.g., 1T. In some cases, such as in this embodiment, the depth may be the same as the thickness. But in other embodiments, such as in embodiment 9B, the depth and thickness may differ.

In this embodiment, the second member 2 is relatively thin along the axis of primary movement of the members 1 and 2 relative to one another and/or along directions perpendicular to a user's skin in use, when embedded in a wearable or handheld device. Preferably, this dimension is less than half another dimension of the member 2, more preferably less than one third, and most preferably less than one quarter of the other dimension. The other dimension may be a maximum length, 2L along the longitudinal axis of the second member 2. For instance, the second member 1 comprises a maximum thickness, 2T, that is less than approximately 6 mm, more preferably less than approximately 3 mm, and most preferably less than approximately 2 mm, for a member 2 having a maximum length of more than approximately 12 mm. The thickness, 2T is preferably substantially uniform along the full length and width of the member 2. The depth is preferably substantially the same or similar as the thickness such that the member 2 has a substantially uniform cross-section along the longitudinal axis, or transverse axis, or preferably along both (excluding variations in cross-section attributable to the coil 2*a*).

In this embodiments, the overall thickness and/or depth 7D of the transducer 7 along the primary axis of motion, and/or along directions perpendicular to a user's skin in use, when embedded in a wearable or handheld device is preferably less than one or both other orthogonal dimensions of the haptics transducer. The maximum depth of the transducer may be less than approximately 0.75 times, or more preferably less than approximately 0.5 times, one or both other orthogonal dimension(s). The maximum depth may be less than approximately 18 mm, or more preferably less than approximately 9 mm, or most preferably less than approximately 6 mm.

In this embodiment, the first member and the second member may comprise substantially similar volumes. The first member and second member may comprise substantially the same or similar maximum widths. The first member and second member may comprise substantially the same or similar maximum lengths. The first member and second member may comprise substantially the same or similar maximum thicknesses or depths.

Figure 1B:
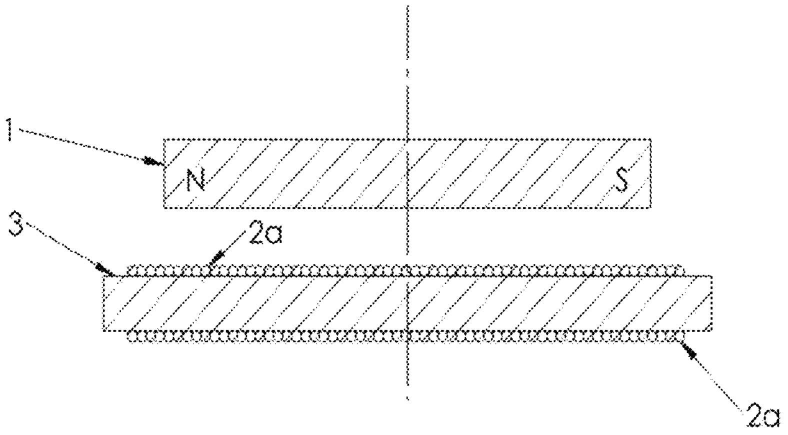
FIG. 1B is a variation of the first haptic transducer embodiment of FIG. 1A.

Referring to FIG. 1B, a variation of the haptics transducer 7 is shown where the second member 2 extends beyond the first member 1 along the longitudinal axis 2B and/or an axis that the coil 2*a* of the second member 2 is wound about. The second member extends beyond the first member at least one end, and preferably at both opposing ends of the second member along the longitudinal axis and/or axis about which the coil is wound. The coil 2*a* may extend laterally beyond the perimeter of the first member, or the former 3, or both. In this example, both the former 3 and the coil 2*a* extend laterally beyond the perimeter of the first member. The first member is a permanent magnet in this embodiment.

As will be described in relation to some embodiments, either the first or second member 1, 2 may be designed to be located in close proximity to a user in use. In some embodiments this more proximal member is designed to be located within a padding component of a wearable device or handheld device. The member may be located at or proximal to a surface of a padding component that is designed to face or be in close proximity to a user in-use. In some embodiments the member may be designed to be located in proximity to user's foot, such as in a shoe or sock (e.g., under insole, inside insole, or inside sock). In other embodiments, the member may be located in a head-worn device such as in a headphone within headphone padding (ear pad or head pad for example).

In some embodiments, the first member 1 is located proximal to an interfacing surface of the apparatus where, in use, pressure applied to a user is substantially high or at a maximum relative to other areas of the interfacing surface. Preferably the first member 1 is located proximal to a part of the user where pressure applied by the device on the user (in use), at a region of the transducer, is greater than approximately 40% of maximum pressure applied by the device on the user (in use), more preferably greater than approximately 60%, and most preferably greater than approximately 80% of the maximum steady state pressure applied (in a stationary state of the user).

In some embodiments, the first member 1 and the second member 2 may be compliantly separated from one another to facilitate relative movement. In some embodiments the overall compliance, per unit area, of the connection between the first member 1 and the second member 2 may be comparable to the compliance, per unit area, between one or more of a wearer's skeleton and the first member 1. The transducer 7 is intended to displace a user's skin in use and, in some embodiments, there may be little point in increasing compliance between member 1 and 2 much beyond compliance between the wearer and member 1, since the resonance frequency of the first member 1 may, and accordingly low-frequency sensitivity in terms of skin displacement, may simply reach a limit set by the latter compliance type. In some embodiments, higher compliance between the first and second members 1, 2 relative to the compliance between the wearer and the member 1 may lead to benefits such as transducer robustness or simplicity, or else to improved comfort. The above compliances are measured along axes that are substantially parallel to the linear axis 20A.

In some embodiments, the transducer 7 may further comprise a compliant coupling between the first and second members. The compliant coupling may be indirect via another body or component. In preferred embodiments, the compliant connection between the first member and the second member is directly between the first and second members 1 and 2 and preferably maintains contact with both members in typical use. Most preferably the compliant coupling is coupled to both the first and the second member to maintain contact across a full range of motion of the transducer 7, e.g., between a first terminal relative position between members 1 and 2, and a second terminal relative position of members 1 and 2.

In some embodiments, a first overall compliance between the first member 1 and a user interfacing surface of the apparatus is substantially less than a second overall compliance between first member 1 and a base of the apparatus (which may be via other components). This may provide improved skin displacement. More preferably the first overall compliance is less than approximately 50% of the second overall compliance and most preferably less than 30% of the second overall compliance. The apparatus may be a headphone for instance, and the first overall compliance may be between the first member 1 and the interfacing pad or fabric cover configured to engage a user's head in use, and the second overall compliance may be between the first member 1 and the base/enclosure of the headphone cup (via the second member 2). In some embodiments there may also be significant compliance between member 2 and the base. This may minimise excitation of the base, which may be undesirable in some instances. The apparatus may alternatively be a shoe in another example and the first overall compliance may be between the first member 1 and the surface of the insole configured to engage a user's foot in use, and the second overall compliance may be between the first member 1 and the base or outsole of the shoe.

In some embodiments overall compliance between a second member and a base is less than 50%, or more preferably less than 30%, versus compliance between first and second members. This may maximise low frequency response, in terms of skin displacement, below the fundamental resonance frequency of the first member relative to the second member.

Figure 5:
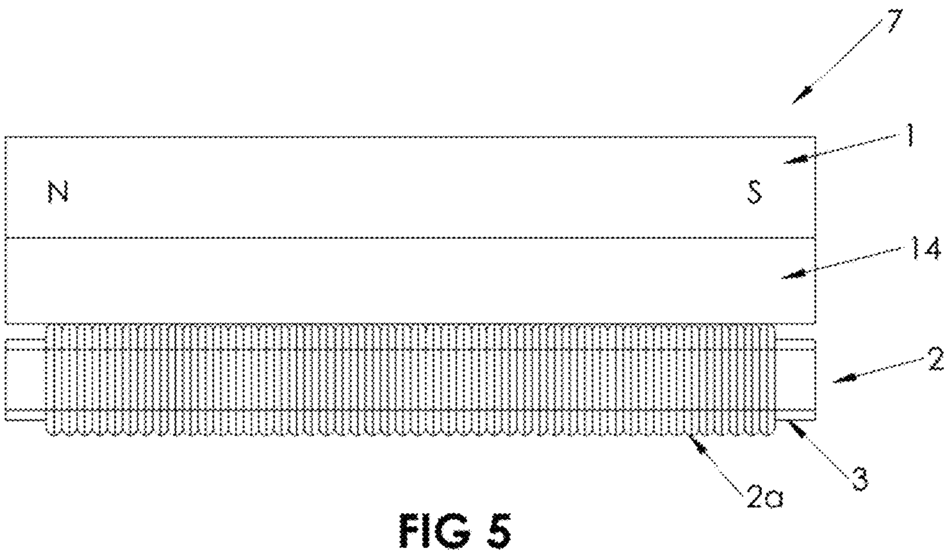
FIG. 5 is a haptic transducer embodiment incorporating a first type of compliant support.
Figure 6:
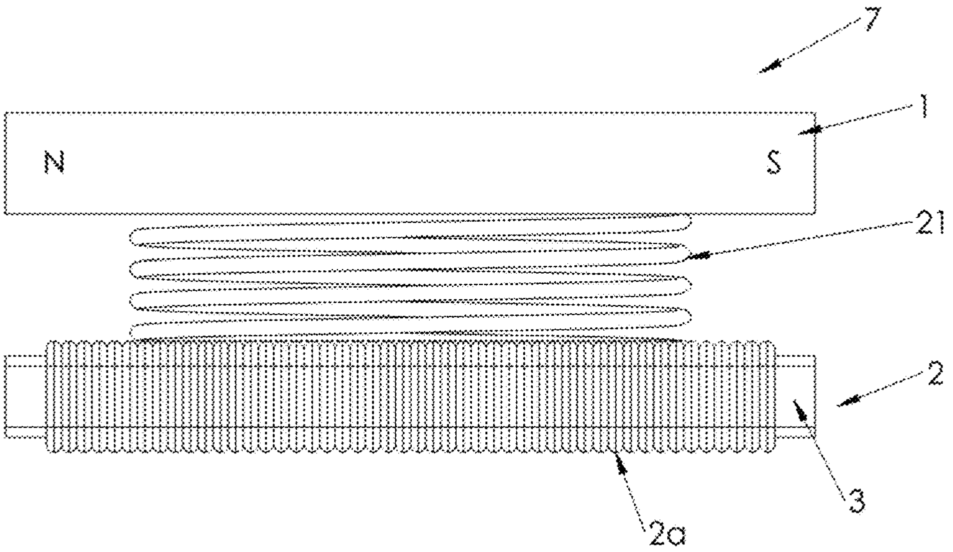
FIG. 6 is a haptic transducer embodiment incorporating a second type of compliant support.

Referring to FIG. 5, in one embodiment a substantially compliant member comprising, for example, one or more layers of a soft plastics, or a foamed plastics material 14 may be provided between the first member 1 and the second member 2, as shown in FIG. 5. Alternatively, the substantially compliant member may comprise a spring 21 such as shown in FIG. 6. A steel spring may be used, for example. The coupling member preferably extends entirely across the opposing surface areas of the first member 1 and the second member 2.

The compliant member 14 or 21 (sometimes herein also referred to as a compliant layer in the case of coupling 14) is substantially resilient and biases the first member 1 and second member 2 away from one another but is compliant to allow the first member 1 and second member 2 to move toward one another in the presence of a force that exceeds the biasing force. Any suitable mechanism may be used for creating a compliant coupling between the first member 1 and second member 2 in such embodiments. Preferably the above is measured in a direction perpendicular to a wearer's skin at point of contact.

The compliant member 14 or 21 is preferably located within an outer periphery or boundary of the transducer 7, and more preferably within the outer periphery or boundary of each of the members 1 and 2, such that it does not extend, significantly, laterally beyond this or these peripheries in directions that are substantially perpendicular to the axis of motion between members 1 and 2. This results in a compact design that can be incorporated in wearable or handheld devices with limited internal real estate. This may lead to improved comfort for example in cases where foam padding in surrounding areas might otherwise be compromised. It is preferred that the compliant member 14 or 21 extends from a centre of at least one, but preferably both members 1 and 2, towards and proximal to the outer periphery of the member or members 1 and 2. In the case of compliant member 14, it is preferred that the member extends substantially adjacent the entirety of one or both opposing faces of members 1 and 2.

The coupling member 14 or 21 is preferably also coupled to both the first member 1 and the second member 2 during the full range of motion between members 1 and 2, i.e., at both a first terminal relative position in which members 1 and 2 are most distal to one another and a second terminal relative position in which members 1 and 2 are most proximal to one another. Preferably, the first member remains in substantially constant contact with the compliant member at least at a sub-region of a side of said first member that faces the second member. Preferably, the second member remains in substantially constant contact with the compliant member at least at a sub-region of a side of said second member that faces the first member.

The compliant member may be directly connected to one or both members 1 and 2 or may alternatively be indirectly connected via one or more other layers. It is preferred that the connection is directly with both the first and second member 1 and 2, or with minimal intermediate layers of materials, so as to maximise available travel while minimising the gap between these members, so as to maximise the magnetic interaction between the members 1 and 2 during operation. The attachment between the compliant member and the first and second members is preferably designed to reduce rattling during operation and wear due to rubbing. In an embodiment, the compliant member is rigidly coupled to one or both of the first and second members, e.g., adhered or welded to one or both of the first and second members.

The compliant member 14 or 21 is preferably formed from a material, materials and/or structure or geometry that maintain or maintains performance even after being subjected to long term loads. If the first member 1 comprises a permanent magnet and the second member 2 comprises a coil 2*a* rigidly attached to a ferromagnetic core such as pole pieces, for instance, then these may attract one-another creating a permanent compression load. Additionally in applications such as footwear, especially, loads from the wearer may be high, albeit potentially applied at shorter durations. Metal springs, such as 21, may perform well when subjected to long term loads, subject to fatigue and permanent deformation constrains. Silicon and urethane may also perform well in terms of elastomers, in the case of a compliant member 14 being applied between members 1 and 2. Also, in the case of compliant member 14, open-cell foams could have an advantage over closed-cell foams associated with their non-reliance on air compressed within closed cells, which may leak over time. In this example, compliant member 14 is preferably formed from an open-cell silicone foam. The compliant member 14 could be non-foamed material formed into compressible geometry, for example four elastomer blocks one of which is located at each corner, fits member connecting to corners of a second member. In some embodiments, the compliant coupling 14 comprises an elastomer having good creep and properties, e.g., silicone, Thermoplastic Polyurethane (TPU) or Cast Polyurethane (CPU).

In situ, with the transducer 7 embedded in a wearable or handheld device, the compliant member 14 or 21 between the first and second members 1 and 2 may transmit force applied to a wearer or user when a main part of the transducer 7 is displaced. In some embodiments, in situ, the compliant member 14 or 21 transmits force between a shoe sole and the sole of a wearer's foot. In other embodiments, in situ, the compliant coupling 14 or 21 transmits force between a wearer's head and a headphone earcup. In yet another embodiment, in situ, the compliant member 14 or 21 transmits force between a wearer's head and a headphone headband.

In some applications, such as in wearable or handheld devices, the transducer 7 may be coupled to a substantially incompressible or a less compressible base of the device relative to the compliant member 14 or 21 between the members 1 and 2. That base may be a headphone earcup, headband, or the outsole of a shoe, for instance. There may be a support between the second member 2 and the base of the device. In some embodiments the support may be a compliant padding, or in some embodiments it may be comparatively incompressible. The member that moves, for instance first member 1, is preferably located closer to the wearer than to the base in such embodiments. The second member 2 that is relatively more stationary, may be attached to a relatively incompressible part of device, e.g., to plastic ear cup in headphone, or to outsole of a shoe. This may provide an advantage that, if the first member is proximal to a relatively less-compliant part of the body, the second member will not begin to move in preference to the first member for example at lower frequencies. In alternative embodiments second member 2 is accommodated within a substantially compliant and non-rigid layer of the device (at least in the direction of motion of the members 1 and 2), e.g., within open cell foam padding in headphone earpad, or within the midsole of a shoe. This may provide an advantage, for example in closed headphone where it may be desirable to displace skin with minimal effect on displacement of the headphone earcup, in order to prevent unwanted changes in air pressure.

In some embodiments, the haptics transducer 7 may comprise multiple compliant members coupled between the first and second members. The multiple compliant members may comprise varying compliance levels. The multiple compliant members may all be wholly contained within a periphery the transducer about the axis of relative motion between the first and second members.

The haptics transducer preferably comprises a fundamental resonance frequency, in terms of movement of the first member relative to the second member, of at least approximately 100 Hz, more preferably at least approximately 150Hz, and most preferably at least approximately 200Hz. A higher cut-off frequency of a frequency range of operation of the haptics transducer is preferably at or below approximately 500 Hz, more preferably at or below approximately 300 Hz and most preferably at or below 200 Hz, the higher cut-off frequency being defined by a −6 dB point of a frequency response of haptics transducer. Greater than approximately 50% of a frequency range of operation of the haptics transducer, measured in octaves, is above a fundamental resonance frequency, in terms of movement of the first member relative to the second member in-situ and during operation, more preferably greater than approximately 60% and most preferably greater than approximately 70%. This may facilitate a more simple, robust, and potentially comfortable device, without unduly degrading low-frequency sensitivity.

The haptics transducer 7 preferably further comprises a communications device configured to receive electronic signals for driving the haptics transducer. The communications device may be a wireless communications device, for instance, configured to receive electronic signals wirelessly.

The haptics transducer 7 further comprises a processing device configured to receive a source signal and generate a haptics signal for driving the haptics transducer 7. The source signal may be an audio signal. The processing device may be configured to generate an audio drive signal for driving an audio transducer associated with the haptics transducer. The processing device may be configured to apply a low-pass filter to the source signal to generate the haptics signal 7. The signal processing component may convert one or more frequencies of the source signal to one or more other target frequencies at which haptics transducer effectiveness is increased. The signal processing component may compress the source signal.

Figure 4A:
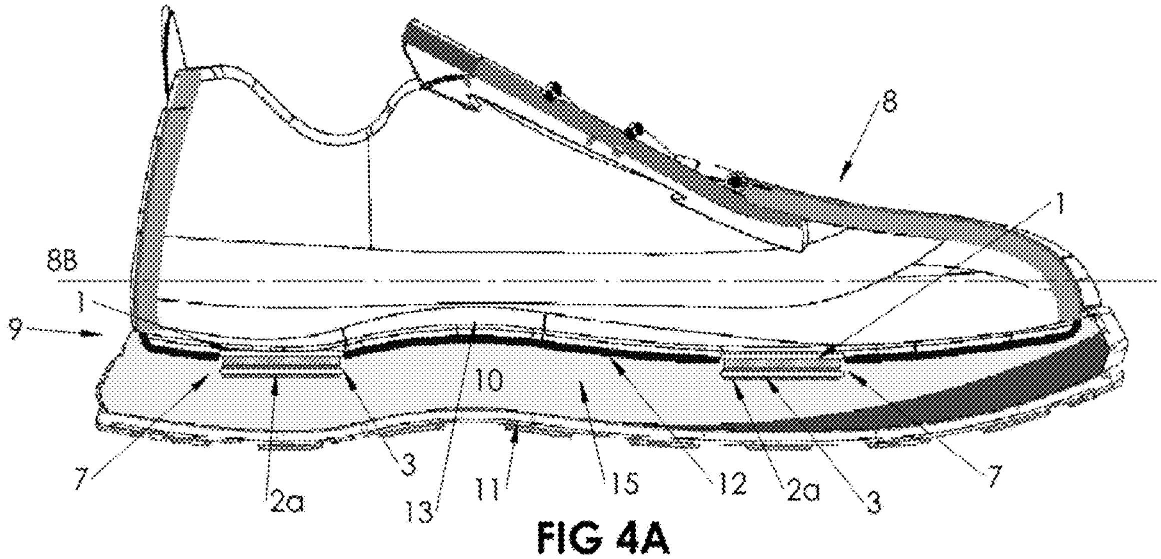
FIG. 4A is an embodiment of footwear incorporating haptic transducers of the invention.

Referring to FIG. 4A, an embodiment of a wearable apparatus in the form of footwear, and in particular a shoe 8 is shown, incorporating a pair of transducers 7 as per the embodiments described herein. The apparatus comprises a base 11, a substantially compliant layer of padding 9, 10 coupled to the base for providing comfort to the user, and a haptics transducer 7 within the layer of padding.

In this embodiment of a wearable apparatus, one transducer 7 is located in the rear of the shoe 8 and configured to locate under and substantially proximal to a user's heel, and the other is located in the front of the shoe 8 and configured to locate under and substantially proximal to the ball of the user's foot. There may be any number of one or more transducers 7 incorporated into the shoe 8, and the locations are preferably selected based on:

- where the user/foot exerts relatively high loads, and/or
- where transducers may be located in relatively close proximity to a wearer's skeleton and/or neuro-receptors, and/or
- where overall compliance of parts of the foot located between transducers and a user's skeleton and/or neuro-receptors may be relatively low.

Such locations may facilitate effective transfer of vibration energy from the transducer 7 to the user's skeleton and/or neuro-receptors thereby potentially increasing the strength and/or quality of haptic sensation. Similar considerations may be made in terms of placement of a haptic transducer 7 in any other wearable or handheld device.

Figure 4B:
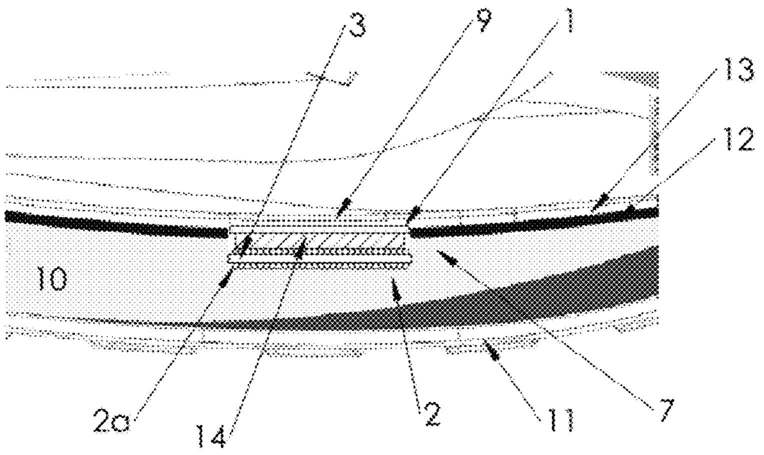
FIG. 4B is a close up of the layers of the sole of the footwear of FIG. 4.

FIG. 4B shows an enlarged view of the front/ball positioned transducer 7. First member 1 is embedded in a flexible, yet relatively and substantially incompressible layer 12 of the insole 9. The insole may not incorporate a substantially incompressible layer 12, however, because the magnet 1 is substantially rigid and also incompressible, comfort may be improved if an incompressible layer 12 is incorporated. It is preferred that the first member 1 is substantially wholly embedded within the insole 9. Accordingly, a recess may be formed in the insole 9 corresponding to the first member 1 for substantially wholly receiving and retaining the first member 1 therein. Preferably, the first movable member 1 is substantially wholly contained within a single padding layer. A face of the first member 1 most proximal to the second member 2 is preferably substantially flush with or entirely contained within the padding layer.

In a preferred implementation, the substantially incompressible layer 12 is still substantially flexible in bending. The relatively small area of the magnet 1 compared to the area of layer 12 means that the overall flexibility of the insole is maintained, particularly in a dimension aligned with the longitudinal axis, 8B, of the shoe 8. Sufficient flexibility in layer 12 also permits compression in lower layers such as the mid-sole to translate to more even loading applied to the foot and hence to increased comfort.

The transducer 7 is structured so that it does not materially alter a compliance profile of the shoe or other device it is incorporated within. For instance, in this embodiment, the overall compliance of a structure comprising the transducer 7 and any padding encompassing or enveloping the whole transducer 7, for example including any insole and midsole as applicable, is similar across the area of the transducer versus one or more areas of the padding immediately adjacent to and surrounding the transducer 7. Preferably the above is measured in a direction perpendicular to a wearer's skin at point of contact with the device, and/or substantially parallel to the direction of motion of the members 1 and 2. Preferably, an overall compliance of the apparatus 8 as exhibited by a user in a region of the haptics transducer 7 in use is substantially the same or similar to an overall compliance exhibited by a user in regions that surround the transducer 7. Preferably the compliance is measured along an axis that is substantially parallel to an axis of linear motion 20A of the transducer 7.

An upper part 13 of the insole is made from a compressible material such as a foamed plastics material (e.g., EVA foam), in order to provide comfort. In this embodiment the outsole 11 is made from a material such as rubber 11. Other suitable materials for the insole and outsole may be utilised, as is known in the art.

The second member 2 of the transducer is coupled to the base 11 of the device or apparatus. The second member 2 may be directly and fixedly coupled to the base. Alternatively, the second member may be coupled via a compliant layer, such as an open cell foam padding layer. In this embodiment, the second member 2 is embedded within the midsole 10, which may be made from a foamed plastics material, such as EVA foam. It is preferred that the second member 2 is substantially wholly embedded within the midsole 10. Accordingly, a recess may be formed in the midsole 10 corresponding to the second member 2 for substantially wholly receiving and retaining the second member 2 therein. Because the second member 2 is substantially incompressible, compliant coupling 14 or 21 may comprise a greater compliance relative to the surrounding midsole 10 to thereby maintain a substantially uniform compliance profile across the length and width of the midsole 10, at least in regions of the midsole that are adjacent and/or surrounding the transducer 7. The goal is that the presence of the member 2 does not result in noticeable change in compliance in the footwear at or adjacent the midsole and/or discomfort. In an alternative embodiment the second member 2 may be substantially decoupled from the base to substantially alleviate or mitigate the transfer of mechanical forces from the second member to the base during operation.

Figure 7:
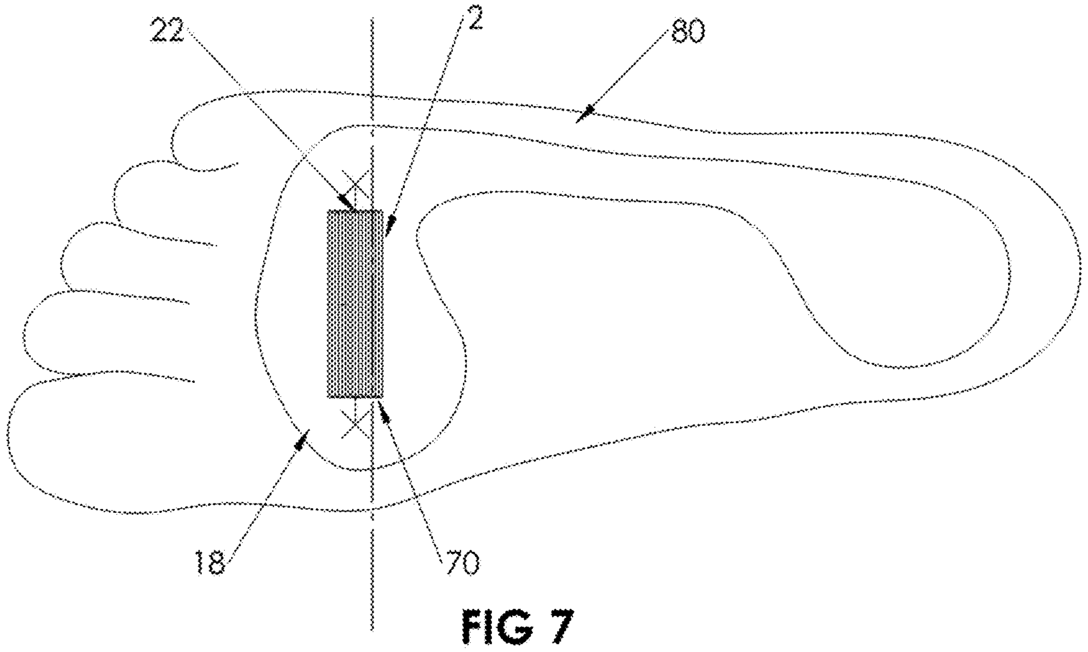
FIG. 7 is an embodiment of footwear incorporating the haptic transducer of FIG. 2.

Other methods of achieving the same result would be apparent to those skilled in the art and are not intended to be excluded from the scope of the invention. For example, an insert or coupling with greater compliance relative to the midsole 10 may be coupled below the transducer 7 to achieve a same or similar result in uniform compliance. Preferably overall compliance of the midsole 10 is similar in the region incorporating second member 2 and in regions adjacent and surrounding the second member 2. Since compliance between first member 1 and second member 2 is important for operation of the transducer, a coupling 14 formed from foam and having good creep properties and/or high resistance to dampness and sweat may be preferable in the present embodiment, to ensure that performance is not unduly degraded over time. In some embodiments, compliant member 14 may be a Silicone foam, a urethane foam, or alternatively a spring 21 as shown in FIG. 7.

A wide range of other transducer geometries and position configurations are possible, as would be readily apparent from this disclosure. The embodiments described herein constitute a few possible examples, which are not intended to be limiting.

In some embodiments a transducer of the invention may be positioned within a mid-section 15 of the footwear so that it may locate under the mid-section of a user's foot in use. Although this is not a load-bearing part of the foot there may be other advantages including:

- there may be more space/height thereby facilitating a thinner sole profile;
- If the transducer is larger and inflexible such positioning may minimise adverse effect on comfort;
- The transducer is centrally positioned under the foot;
- A single transducer may be able to excite the entire foot, particularly if layer 9 and/or other features are designed in such a way that vibration is transmitted to other regions of the foot.

In some embodiments the insole is bonded in place, which may prevent the insole 9 from shifting thereby affecting alignment between the first and second magnetic members 1 and 2. Bonding may also reduce rattling that may occur if the transducer is operated when there is no load on the insole. In some embodiments the coil is bonded to any substrate, for example, onto any ferromagnetic pole piece. In general, it may be advantageous to bond as may parts as possible in order to minimise the chance of rattling and/or wear via rubbing.

Variations may be made to any one of the footwear embodiments described herein as outlined below. In some embodiments one or more parts of the insole may be made to be relatively rigid in order to facilitate transmission of vibration from transducer 7 in horizontal directions to a wider area of a wearer's foot. In some embodiments incompressible layer 9 and magnetic member 1 may be incorporated into the sole, for example above the midsole 10. They may be bonded to the midsole 10. In some embodiments one or more magnetic members 1 may be located in the upper region of the insole and there may be no incompressible layer. This may reduce manufacturing complexity. In some embodiments magnetic member 2 may be located at the bottom of the mid-sole 10, adjacent to the outsole 11, for example, which may achieve reduced stack height. In some embodiments the transducer may be configured to be an inertial actuator, for example the region between the magnetic member 2 and the outsole 11 may be either removed or replaced with highly compressible material such as low-density foam, so that load bearing no longer occurs directly through the transducer. The connection material 14 between the members 1 and 2 may therefore be made to be relatively more compliant, which may permit a lower fundamental resonance frequency of member 2 with respect to member 1.

As previously mentioned, in any one of the transducer implementations described herein, the positions of the magnet 1 and electromagnet 2 may be reversed, for example the electromagnet may be located closer to a wearer in use, relative to the permanent magnet. In any one of the footwear implementations described herein, this means the electromagnet 2 would be located in or adjacent the insole and closer to the wearer's foot, in use, relative to the permanent magnet which may be located in the mid-sole.

Figure 2:
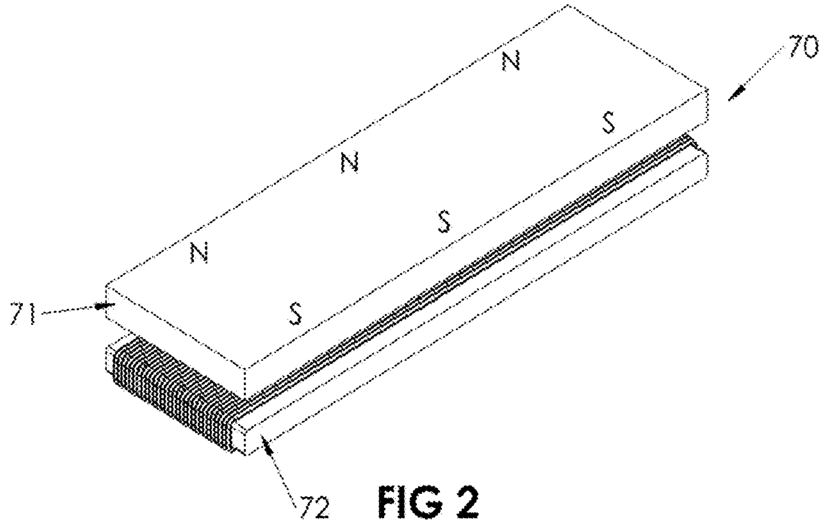
FIG. 2 is a second haptic transducer embodiment of the invention.

Referring to FIG. 2, an embodiment of an elongate transducer 70, having elongate first and second magnetic members 71 and 72 is shown. Such a transducer 70 may provide haptic stimulation over a wider area and may be implemented in a wearable apparatus, such as in footwear 8. Referring to FIG. 7, if deployed in footwear, such a transducer 70 may be positioned underneath the transverse arch 22 of a user's foot 80 in use, along a transverse axis 8C of the footwear substantially perpendicular to a longitudinal axis 8B of the footwear and user's foot, in use. One end of the transducer 70 may be positioned to locate under the ball 81 of the user's foot, and the other on an opposing side of a central longitudinal axis, at or near an outer side of the footwear and a user's foot, in use. Considering that footwear soles are normally flexible, yet the transducer 70 is substantially inflexible, this positioning can enhance comfort to some users as it reduces bending of the midsole in the transverse direction, especially if the shoe 8 is designed primarily for use on flat surfaces. Also, the transducer 70 is positioned to excite a key load-bearing region of the foot promoting haptic stimulation for the user.

Another advantage of using an elongate inflexible transducer 70 over multiple adjacent transducers 7 is a single larger coil may be used, thereby reducing part count and minimising cost. Power handling may be increased in this embodiment, relative the embodiment of FIG. 4A, however.

Figure 9A:
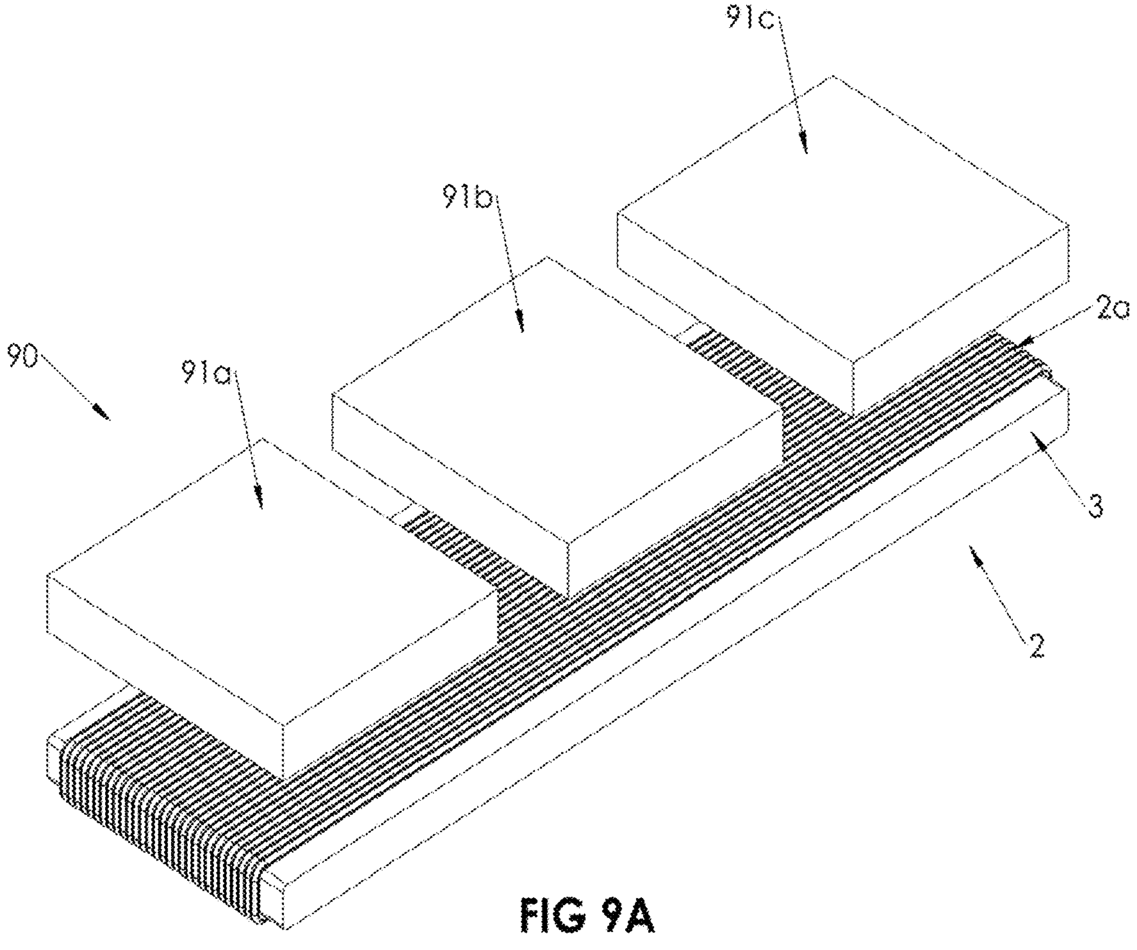
FIG. 9A is another haptic transducer embodiment of the invention.

Referring to FIG. 9A, an embodiment of a transducer 90 is wherein a first member 91 comprises three separate body parts 91*a*-9*c*. Each part 91*a*-91*c* is a permanent magnet in this embodiment, or it may be any other magnetic member as herein described in relation to other transducer embodiments. This configuration could provide increased comfort to some users if embedded in wearable apparatus such as footwear 8, for instance, as the separation between the parts 91*a*-91*c* can increase flexibility of the transducer 90 along a longitudinal axis of the transducer 90. In this embodiment the second magnetic member 2 comprises a single elongated body that is substantially inflexible and spans along a substantially similar distance as the distance spanned by all three body parts 91*a*-91*c* of the first member 90 along the longitudinal axis of the member 2, in situ.

It is preferred that the transducer 90 is aligned with the transverse arch, in a footwear 8 implementation. It will be appreciated that any number of two or more parts may be used for first magnetic member 90 in this embodiment. Note that multiple magnets 91*a*-91*c* in close proximity may exert forces on one-another, for example they may repel one-another (or attract, depending on the configuration). In some configurations, the body parts 91*a*-91*c* are embedded in an incompressible layer or body, which may be separate to or form part of a wearable or handheld device in situ, that is preferably sufficiently rigid to maintain the magnet's positions over time. The body parts 91*a*-91*c* may be coupled to the incompressible layer via strong adhesive bond. This configuration may reduce the effects of magnetic forces that might otherwise by exhibited by the body parts 91*a*-91*c* when located in sufficiently close proximity to one-another. As in other embodiments, a substantially compliant member preferably connects between the first body parts 91*a*-91*c* and the second member 2. In one variation a single compliant member may connect to all three body parts 91*a*-91*c* and the second member 2. In another variation multiple compliant members may connect between the second member and one or two corresponding body parts 91*a*-91*b*. The configurations of the coil 2*a* may be as previously described for other embodiments.

The polarities of each of the magnets of the first and second members may be on either side of a longitudinal axis in some implementations, or on either side of a transverse axis in other implementations as described for the FIG. 1A embodiment. Unless otherwise stated, these variations in magnetic body polarities applies to all embodiments described herein.

The haptics transducer preferably comprises less than 4 permanent magnets, more preferably less than 3 permanent magnets.

Figure 9B:
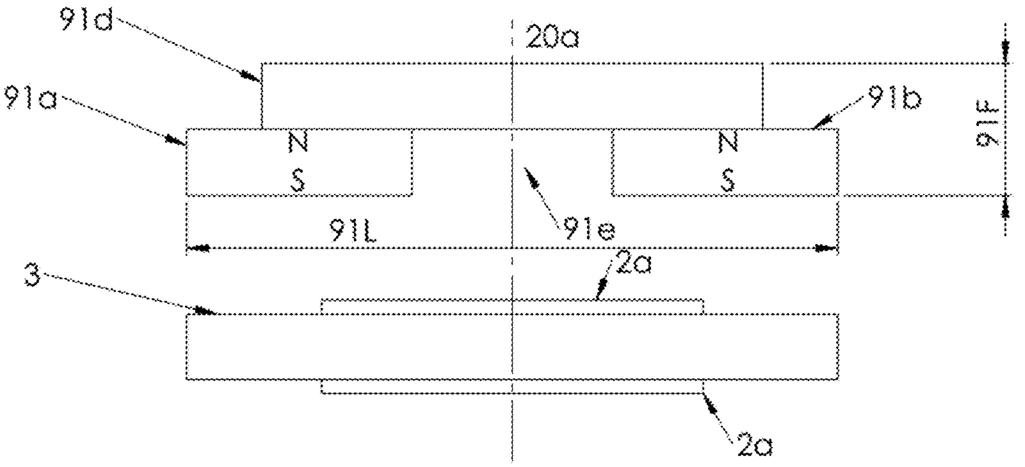
FIG. 9B shows another haptic transducer embodiment of the invention.

Referring to FIG. 9B, a variation of the embodiment of FIG. 9A may further comprise a substantially rigid and solid magnetic body or plate 91*d* coupled to and between the magnetic bodies 91*a* and 91*b* of the first member 91. The solid plate 91*d* is preferably fixedly coupled to an opposing side of bodies 91*a* and 91*b* to the side that opposes second member 3. The solid plate is preferably formed from a ferromagnetic or other magnetic material that is not a magnet, such as steel. In this embodiment, the coil 2*a* is wound about the longitudinal axis of plate 3, as in the FIG. 1A embodiment.

In this embodiment, the north and south poles of the permanent magnets 91*a* and 91*b* are on opposing sides of the thickness dimension of the magnet. The magnetic poles of each magnetic body may be on opposing ends of an axis that is substantially parallel to the axis of linear motion 20A of the transducer. Alternatively, the poles are on opposing ends of a transverse axis that is substantially perpendicular to the axis of linear relative motion. The orientation of the poles is reversed in magnet 91*b* relative to magnet 91*a*. In other words, the north-south direction of magnet 91*a* is in the opposite direction relative to the north-south direction of magnet 91*b*. In this manner, both magnets 91*a* and 91*b* impart a substantially circular magnetic field (in this case clockwise) passing from left to right in the upper solid plate 91*d*, and from right to left in lower core 3 of member 2. The field also passes upwardly from the left-hand side of solid plate 3 into the left-hand side of solid plate 91*d*, and downward from the right-hand side of solid plate 91*d* to the right hand side of core 3. It will be appreciated that the orientation of the poles may be reversed so the magnetic field is generated in an opposing, anti-clockwise direction.

This circuit creates an induced magnetic field in the magnetic plate 91*d* that is substantially perpendicular to the linear axis of motion 20A. Similarly, an induced magnetic field is generated in the core 3 that is substantially perpendicular to the linear axis of motion 20A. The or these fields is or are generated regardless of receipt of electronic haptics signals and/or when the first and second members are in a neutral operating position.

A relatively high proportion of this magnetic circuit comprises highly permeable material (being the plates 91B and 3.) The same applies to the field generated by the coil 2*a*. The magnetic surface area is large, creating a reasonably large driving field. Meanwhile the volume of permanent magnets 91*a* and 91*b* is reduced compared to the embodiments of FIG. 1A, 1B and FIG. 2.

This configuration results in a substantially permanent attraction force between the first and second members. The force of attraction is dependent on the current through the coil 2*a*. In other words, the current will act to strengthen/increase the attraction force when flowing through the coil in a first direction and will weaken/reduce the attraction force when flowing through the coil in an opposing second direction. In this manner, the first member and second members exhibit an attraction force, in use, regardless of direction of electrical current through the second member.

In this embodiment, a total mass of the first member 91 comprises at least approximately 50% of a body or bodies that operatively couple the second member to generate movement of the first member, more preferably at least approximately 65% and most preferably at least approximately 80%. The body or bodies may comprise any combination of one or more of permanent magnets, ferromagnetic bodies and/or electromagnetic bodies. This means helps to maximise force generation relative to the space taken and relative to the mass. Generating force from permanent magnets and/or ferromagnetic material, as opposed to a coil for example, may provide benefit associated with absence of electrical connection to the moving part.

In this embodiment, despite the first member 91 comprising multiple magnetic bodies, it still comprises a substantially small depth 91F along a dimension that is substantially parallel to the axis of linear motion 20A between the first and second members, relative to other orthogonal dimensions of the first member. For example, a maximum depth of the first member may be less than approximately 0.5 times, more preferably less than approximately one third, and most preferably less than approximately 0.25, of at least one other dimension that is substantially orthogonal to the depth dimension. The other dimension may be the width and/or length dimension(s) (e.g., 91L shown in the figure) for instance. The maximum depth may be less than approximately 6 mm, more preferably less than approximately 3 mm and most preferably less than approximately 2 mm.

It will be appreciated that other magnetic pole and coil configurations may be implemented for this embodiment as in the other embodiments described herein.

Figure 3:
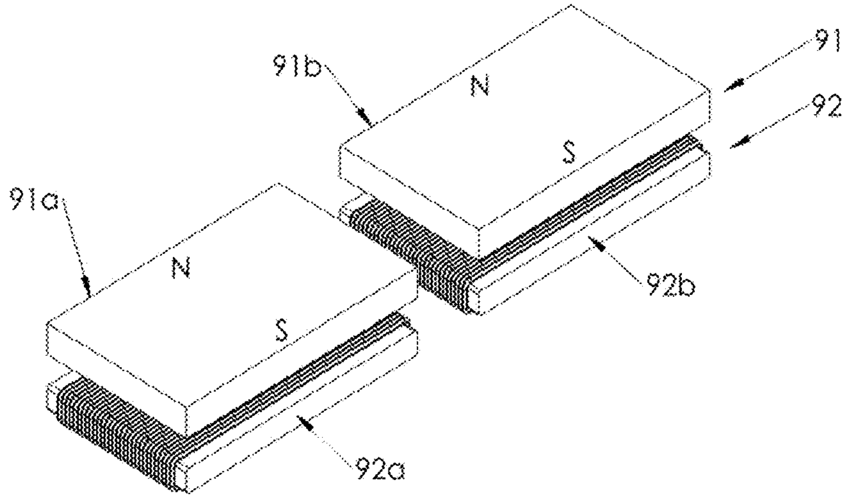
FIG. 3 is a third haptic transducer embodiment of the invention.

Referring to FIG. 3, in another embodiment, a second member 92 of a transducer (or transducers) may also be formed from multiple second body parts 92*a*-*b* that are aligned with multiple and oppose corresponding first body parts 91*a*-91*b*. In this embodiment both the magnetic members 91 and 92 are broken into separate parts and so effectively there are multiple transducers if there is no compliant member or a separate compliant member for each pair of opposing first and second body parts. On the other hand, a single compliant member common to all opposing first and second body parts 91*a*-*b* and 92*a*-*b* may form a single transducer. In this embodiment, the advantage of two or more smaller transducers or sub-transducers may be positioned in locations that optimise vibration transfer, yet flexibility is maximised. For example, in one embodiment a pair of smaller transducers or sub-transducers can be located under the transverse arch of footwear 8, on either side of a central longitudinal axis of the footwear 8. A third transducer of similar size to the transducers or sub-transducers may locate under the heel in such an embodiment. Since the area of each transducer is small the flexibility of the sole of the footwear will remain high.

When implemented in a wearable or handheld device the one or more first members locate in closer proximity to a user in use, relative to the second members.

In the embodiments of FIGS. 3 and 9A there may be any number of two or more first member body parts to achieve a desired collective flexibility for a particular implementation. In such embodiments, the one or more first member body parts may be connected via a coupling, and preferably a compliant or flexible coupling to permit movement relative to one another. The one or more second member body parts of FIG. 3 may also be connected via a coupling, and preferably a compliant or flexible coupling.

The compliant couplings of the first member body parts, or of the second member body parts, or both may comprise flexible hinges. The flexible hinge is preferably configured to permit relative rotation but resist relative motion that is substantially purely translational.

In some embodiments, the hinge may comprise multiple flexible hinge sections oriented at different angles relative to a hinging axis. Preferably the flexible hinge sections are substantially thin in one direction and elongated in another, when viewed along the hinging axis. Preferably, the flexible hinge sections pass through, or at least close to, a hinging axis.

Such embodiments may be suitable for applications where forces between multiple first member bodies or body parts, or between multiple second member bodies or body parts, may not be resisted by an attached layer without affecting comfort. An example application is a headphone earpad. Such discomfort may be exhibited if the relatively rigid magnetic bodies or body parts are located close to a wearer, for example proximal to the surface of an earpad, where there may be only a thin foam and/or fabric layer between the magnetic bodies and the wearer. In such cases hinges may connect multiple magnetic bodies to substantially permit relative rotation but substantially resist relative translation enhancing comfort.

Figure 10A:
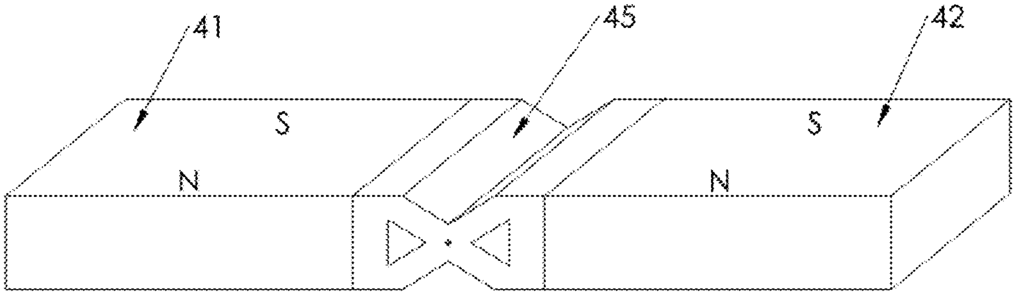
FIG. 10A is a section of a haptic transducer embodiment having two adjacent first members coupled by a first type hinge.
Figure 10B:
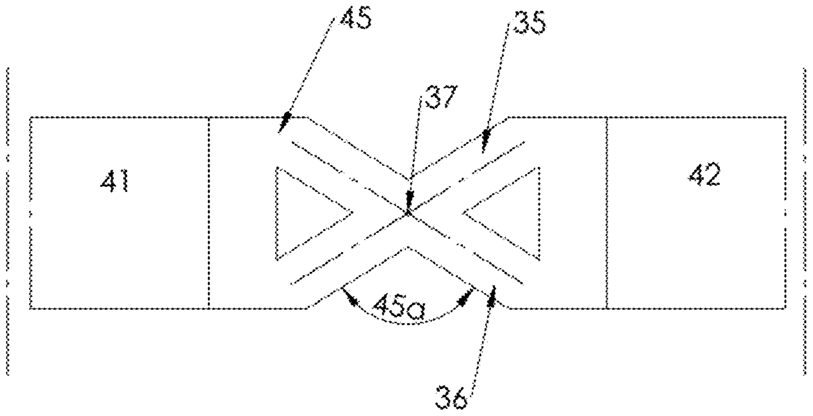
FIG. 10B is a close up of the hinge of FIG. 10A.

Referring to FIGS. 10A and 10B, an embodiment of a coupling 45 which may connect two magnetic body parts 41 and 42 of two adjacent transducers or sub-transducers is shown. This coupling 45 may be implemented between multiple first members or first member body parts, such as between the first member body parts of the embodiments of FIGS. 3 and 9. Alternatively, or in addition they may be implemented between multiple second members or second member body parts as in in the embodiment of FIG. 3.

The coupling 45 enables relative movement, and preferably relative rotation while substantially restricting relative translation between the magnetic bodies 41 and 42. The coupling 45 may be formed from a substantially flexible material having two substantially flexible members or sections 35 and 36, both of which pass through a common axis of rotation 37. Flexible sections 35 and 36 may comprise an elastomer, for example TPU or Silicone, although other materials could be used as would be apparent to the person skilled in the art.

Each section 35, 36 is elongate along a first axis that is substantially parallel to the axis of rotation and relatively thin along the length of the section 35, 36 for flexibility. The sections 35 and 36 are angled relative to one another so that collectively they enable relative rotational movement but restrict relative translational movement. In this manner they form a substantially flexible cross-hinge 45. An angle, 45A, between the first and second sections 35 and 36 may be at least 30 degrees, more preferably at least 45 degrees, even more preferably at least 60 degrees and in some embodiments, as in the FIGS. 10A and 10B it may be approximately 90 degrees. In this manner, magnetic bodies 41 and 42 are able to rotate relative to one-another about axis 37, but tension and compression forces along the lengths of hinge sections 35 and 36 are substantially resisted. Accordingly, the hinge substantially resists pure translation of the magnetic bodies 41 and 42 relative to one another. Each flexible hinge section 35, 36 is rigidly coupled to the corresponding magnetic body 41, 42 at either end of the section.

Figure 10C:
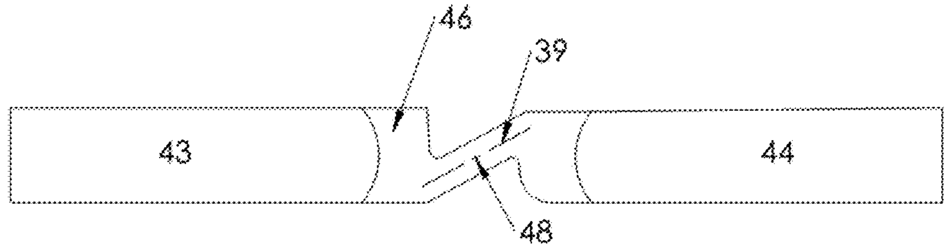
FIG. 10C is a section of a haptic transducer embodiment having two adjacent first members coupled by a second type hinge.
Figure 10D:
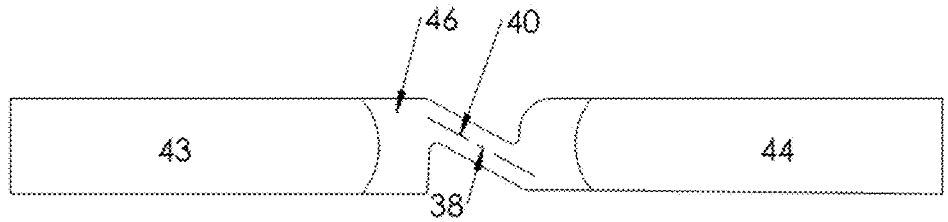
FIG. 10D is a close up of the hinge of FIG. 10C.

Referring to FIGS. 10C and 10D, an alternative coupling 46 is shown comprising flexible sections 39 and 40 that adjacent to one another but substantially non-overlapping along the axis of rotation 38. First hinge section 39 extends along a length of the rotational axis 38, and a second portion 40 extends along another length of the rotational axis 28. The sections 39 and 40 may be similarly angled as mentioned in relation to the coupling 45, but substantially non-overlapping. The relative angle between the flexible sections 39 and 40 may alternate multiple times, meaning that there may be a first section where the connection is at 45 degrees, and a subsequent section where the connection is at −45 degrees, as one moves along the axis 38, as required to achieve a stable hinge that permits rotation yet is resistant to relative translation between parts 43 and 44. The coupling 46 may exhibit manufacturing benefits and be relatively easy to over-mould (relative to coupling 45 for instance), due to an absence of hollow parts between the hinge sections Any number of two or more magnetic bodies may be interconnected in the manner described in relation to FIGS. 10A-10D in any of the embodiments described herein.

Figure 12A:
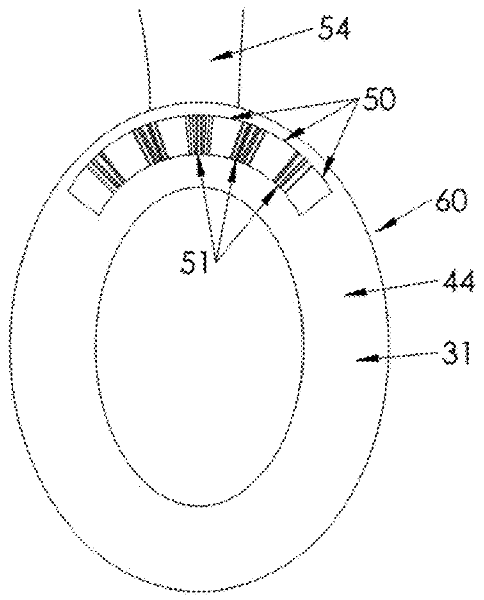
FIGS. 12A-12C show another transducer embodiment of the invention incorporated in a headphone earpad designed to apply vibration to a wearer's head.

Examples of other suitable hinges that may be utilised to connect two or more magnetic bodies of the embodiments described herein are disclosed in section 3 of PCT patent publication WO2017/046716, the contents of which are hereby incorporated by reference. Referring to FIG. 12A, for example, an embodiment of a transducer or multiple transducers having a series of magnetic bodies 50 connected via hinges 51 is shown. The magnetic bodies 50 may be the first member body parts of a transducer or first members of multiple transducers, for instance. In this embodiment, the hinges 51 connected the bodies 50 in a substantially curved manner to follow the profile of a curved wearable and/or handheld device, such as a headphone earpad 52. The series of bodies 50 may optionally be bonded directly underneath a thin fabric covering over earpad 52, with recesses in pad 52 to retain magnetic parts 50 so that they do not protrude.

Figure 12B:
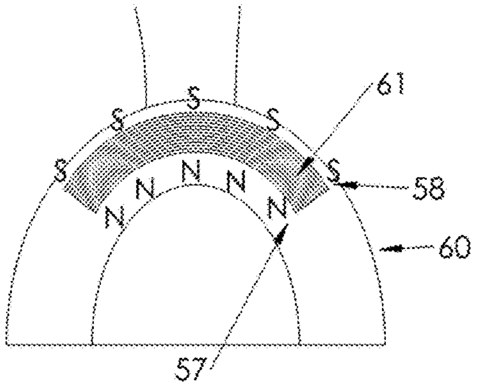

A curved coil 61, such as shown in FIG. 12B, may be mounted proximal to series of bodies 50, to provide excitation. Coil 61 may, for example, be rigidly mounted to a base frame of the earphone cup. In some embodiments the coil has a ferromagnetic core. In some embodiments there is no ferromagnetic core.

In an alternative embodiment (not shown) a series of coils are connected directly underneath a thin fabric covering over earpad 52.

Another alternative configuration of a haptics transducer will now be described with reference to FIGS. 13A-13C. In this embodiment, a substantially annular coil 57 (FIGS. 13Band 13C) is rigidly retained in a complementary annular recess 56 (FIGS. 13A and 13C) of a body 55. The body 55 may comprise a ferromagnetic material. When a haptics drive signal is received through coil 57, magnetic poles are created in the ferromagnetic material 55, with one pole forming internally of the coil 57 at inner region 61 of the ferromagnetic body 55, and the opposite pole forming externally of the coil at an outer peripheral region 62 of the ferromagnetic body 55.

A compliant material 59 couples the coil 57 and ferromagnetic body 55 to a permanent magnet 58 located proximal to the coil 57 face of the ferromagnetic body 55. In some embodiments a plate of ferromagnetic material may replace permanent magnet 58. Magnetisation of magnet 58 forms a permanent pole in the centre region and an opposite pole at the periphery to complement the poles at inner and outer regions 61, 62 62 of the ferromagnetic body 55. It is preferred that the magnetic body 58 is substantially thin.

The compliant material 59 may be a material of a wearable or handheld apparatus, such as the inner sole of a shoe, above outsole 60. Upper surface of magnet 58 may sit flush with the upper surface of the inner sole 59 in this case. Alternatively, the compliant material 59 may be a separate member to the wearable or handheld apparatus but embedded within in situ. It will be appreciated that any compliant member described herein in relation to other embodiments of the invention may be used in place of compliant material 59.

In this embodiment, the coil 57, body member 55 and magnet 58 are substantially annular, but in alternative forms they may take on other suitable shapes such as substantially rectangular.

Figure 8A:
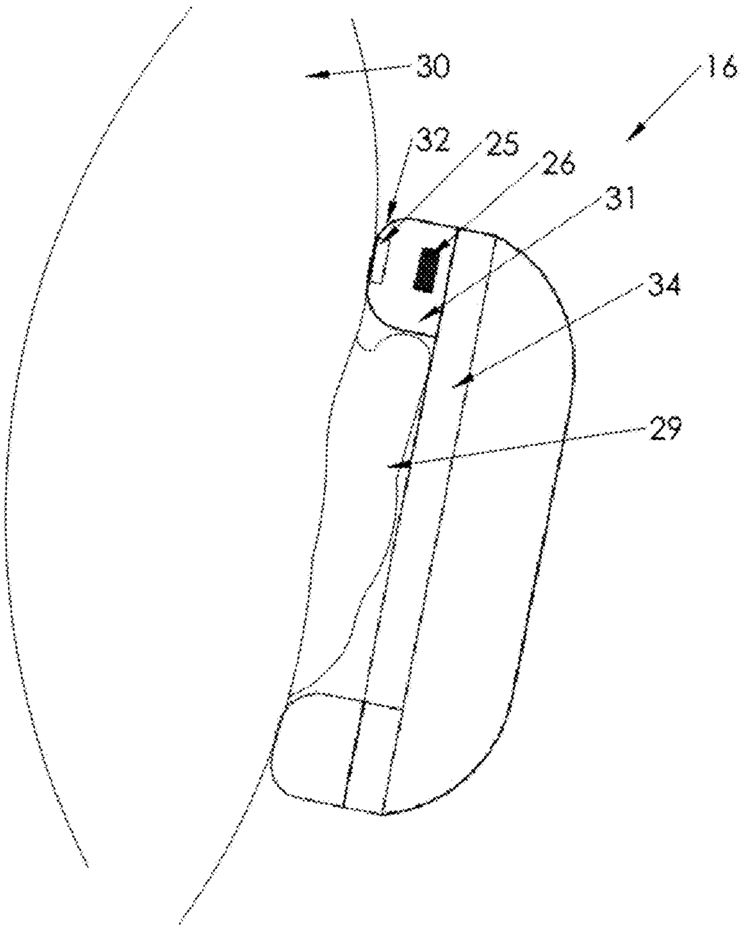
FIG. 8A is an embodiment of a headphone cup apparatus incorporating haptic transducers of the invention.
Figure 8B:
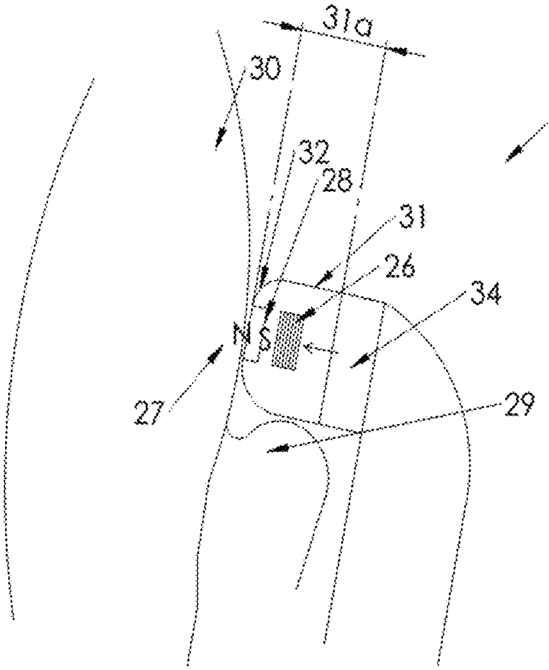
FIG. 8B is a close up of the padding of the headphone cup apparatus of FIG. 8*a*.

FIGS. 8A and 8B show an exemplary embodiment of another wearable device 16 incorporating an exemplary transducer of the invention. In this embodiment, the wearable device 16 is a headphone having a haptic transducer embedded in at least one of the headphone cups, for providing excitation in padding of the headphone cup. In this embodiment, a first magnetic member 25 of the transducer, comprising a permanent magnet, is coupled to the inside of fabric covering 32 over an ear pad 31. Fabric covering may be leather or velvet or any other suitable fabric. Ear pad 31 surrounds a user's ear 29, in use, and may comprise a low-density open cell flexible foam, for example. In this embodiment, the headphone 16 has a base or body 34 (e.g., ear cup) and a surface 32 of the body 34 (e.g., the fabric covering) that is configured to locate directly against or adjacent a user's body in use. Preferably the first member 25 of the transducer locates adjacent to the surface 32 of the body 34. Preferably the first member 25 is located directly adjacent to the surface 32 of the body 34.

The padding 31 preferably comprises a substantially flexible foam material, for example urethane foam. In an embodiment, the padding 31 provides high compliance so that it is able to conform to soft, non-load bearing (e.g., not sole of foot) parts of a user's body, providing comfort. For example, a thickness 31*a* of the padding 31 is at least approximately 3 mm, more preferably at least approximately 5 mm, and most preferably at least approximately 8 mm. In this manner, the padding 31 is capable of conforming to soft, non-load bearing (e.g., not sole of foot) parts of the user's body, providing comfort. In an embodiment, a density of the padding material is at least approximately 20 kg/m^3, more preferably at least approximately 30 kg/m^3, and most preferably at least approximately 40 kg/m^3. In an embodiment, the padding 31 is configured to compress more than 25% within 5 minutes with applied pressure of at least approximately 300 kg/m^2, more preferably with pressure of at least approximately 500 kg/m^2, and most preferably with pressure of at least approximately 800 kg/m^2. The above compressibility may be provided over a significant thickness of the padding 31. Preferably the above compressibility is provided over a padding thickness of at least approximately 3 mm, more preferably at least approximately 5 mm, and most preferably at least approximately 8 mm.

The padding covering 32 is preferably substantially thin, and preferably less than approximately 1 mm, more preferably less than approximately 0.5 mm, and most preferably less than approximately 0.3 mm. For example, it could be fabric, leather, or faux leather. Preferably the padding covering 32 is flexible.

A second magnetic member 26 is embedded within earpad padding 31 in substantially close proximity to first member 25. First member 25 comprises a permanent magnet with north 27 and south 28 poles on either side of a plane that bisects the member 1 and that is parallel to the longitudinal and transverse axis of the member 1 (i.e., at either end of a thickness dimension of the member 1). Although other configurations are possible. The second member 26 comprises a coil that is wound and positioned to magnetically interact with the first member 25 to cause relative movement of the members 25 and 26 that correspond to the current received by the coil. In a preferred embodiment, the first and second members 25, 36 are arranged such that there is minimal or substantially zero rotational component in their relative movement. Preferably also, translation force 33 is in a direction that is substantially perpendicular to the fabric surface 32 at the location of first member 25. The coil of second member 26 may be wound about an axis suitable for providing force outcomes described above depending on magnetisation/orientation of the magnet. For instance, in the case of the north and south poles of member 25 being position at opposing ends of the thickness dimension, the coil of member 26 is wound about an axis oriented substantially parallel to the direction of relative movement 34 between the first and second parts. In an alternative embodiment the coil is wound about an axis oriented substantially parallel to a surface of a device configured to contact the user's skin in use.

Ferromagnetic pole pieces fixed to either the first member 25 or to the second member 26 or coil of the second member are not used in this embodiment. This may reduce driver efficiency, however, since the first member 25 is able to couple to the wearer's body in use, and is not required to move an entire ear cup in the process, the forces required may be reduced thereby offsetting lower driver efficiency. Ferromagnetic parts may be added, however in some configurations. In these configurations care should be taken to minimise the steady state attraction between the magnet 25 and other ferromagnetic elements associated with the second member 26, so as to avoid causing collapse of earpad 31 foam that separates them, either immediately or over time. This may be achieved by use of a small magnet, thin ferromagnetic material, or large separation, for example. This may be preferred in this embodiment where compliant support of both first and second members is via a low-density foam with relatively low resilience compared to other potential implementations. Preferably the magnet 25 is not unduly attracted to or repelled from other parts in proximity, for example to magnetic/ferromagnetic parts in ear cup 29, a headphone driver magnet assembly (not shown), or to any other magnets or ferromagnetic components in haptic transducers in the same or an opposing ear cup.

In use, when a haptics signal is applied to coil 26 this causes vibration of first member 25, which may be passed to a wearer's head 30. A surface area of the member 25 which is intended to transfer haptic feedback to a user in use is preferably determined by keeping comfort to the user in mind.

In some embodiments a mass (not shown) is fixed to second member 26 in order to reduce or alter displacement characteristics relative to first member 25 in-use. This may improve frequency response and/or increase force generation at certain frequencies.

In some embodiments the mass of second member 26 and/or compliance of surrounding ear pad material 31 is selected to create a resonance frequency suitable for optimised transmission of haptic information. For example, the resonance frequency of second member 26 in direction towards/away from first member 25 may be between approximately 20 Hz and approximately 80 Hz, or more preferably between approximately 40 Hz and approximately 60 Hz. This may optimise transducer efficiency and/or tune response for optimum effectiveness.

In some embodiments second member 26 is fixed to body 34, which may reduce displacement of second member 26.

Any one of the haptic transducer embodiments described herein may be implemented in the headphone apparatus without departing from the scope of the invention. Multiple transducers may be employed in a single earcup of a headphone apparatus. In such an embodiment, the transducers are preferably sufficiently spaced so that forces between magnets and/or other magnetic members of adjacent transducers do not cause warping of earpads, either immediately or over time.

Advantages of a haptic transducer of the invention being implemented in a headphone apparatus include:

- apply force directly to wearer's head;
- No need to move entire headphone cup. Especially in the case of a closed earcup design, vibration of the entire earcup by a haptics transducer may create air compression and thereby interfere with audio reproduction;
- higher efficiency at least in terms of that vibration is delivered directly to user;
- possibility to connect the haptic transducer in series with a headphone driver, eliminating need for additional drive circuitry;
- high simplicity;
- Robustness;
- Low mass; and
- Potentially wide bandwidth compared to some existing haptic transducers.

In some embodiments a haptic transducer is deployed in a headphone, and is connected in parallel with an audio transducer. In an alternative embodiment a haptic transducer is deployed in a headphone, and is connected in series with an audio transducer. In some embodiments the device is a passive headphone.

A low-pass filter may be used in conjunction with the haptics transducer limiting bandwidth to reduce overall power consumption. The low-pass filter may comprise an inductor and/or a capacitor. In some embodiments a headphone or other device comprises a switch and/or a haptic strength controller for the haptics transducer. The haptic strength controller may comprise a variable resistor, for example.

In some embodiments mass of member 26 and/or compliance of surrounding ear pad material is selected to create a resonance frequency suitable for optimised transmission of haptic information. For example, the resonance frequency of member 26 in direction towards/away from member 25 may be between 20Hz and 80Hz, or more preferably between 40Hz and 60Hz, for example. This may optimise transducer efficiency and/or tune response for optimum effectiveness.

In some embodiments the transducer is controlled by an independent electronic circuit/amplifier. In some embodiments drive signal is equalised. In some embodiments drive signal is phase corrected to help match timing of haptic forces with corresponding source signal, particularly in case of impulses. In some embodiments predicted or actual excursion and or maximum amplifier output are monitored, and the signal adjusted accordingly, for example low frequencies may be attenuated, to avoid potential issues such as over-excursion. In some embodiments, a lumped parameter model of transducer characteristics is used for phase correction and/or excursion prediction. Alternatively, filters are used, for example IIR or FIR filters.

Multiple transducers may be employed to provide more even force application. In such an embodiment, the transducers are preferably sufficiently spaced so that forces between magnets and/or other magnetic members of adjacent transducers do not cause warping of earpads, either immediately or over time.

Further Alternative Coil Orientation

Figure 13A:
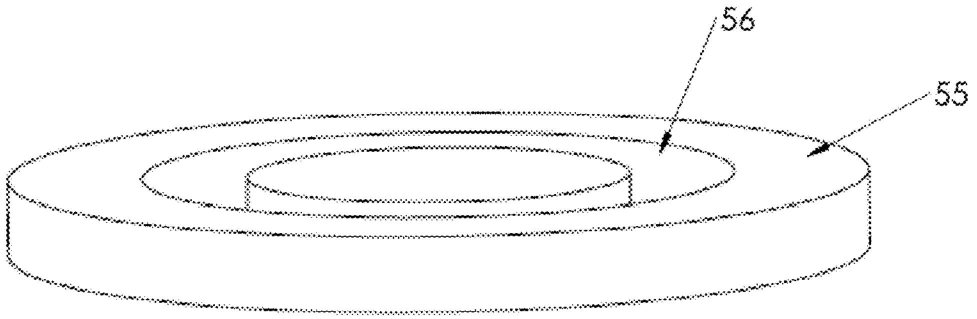
FIGS. 13A-13C show another haptic transducer embodiment of the invention.
Figure 13B:
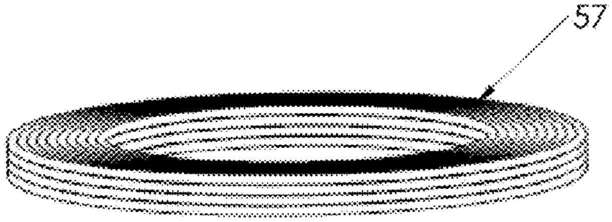
Figure 13C:
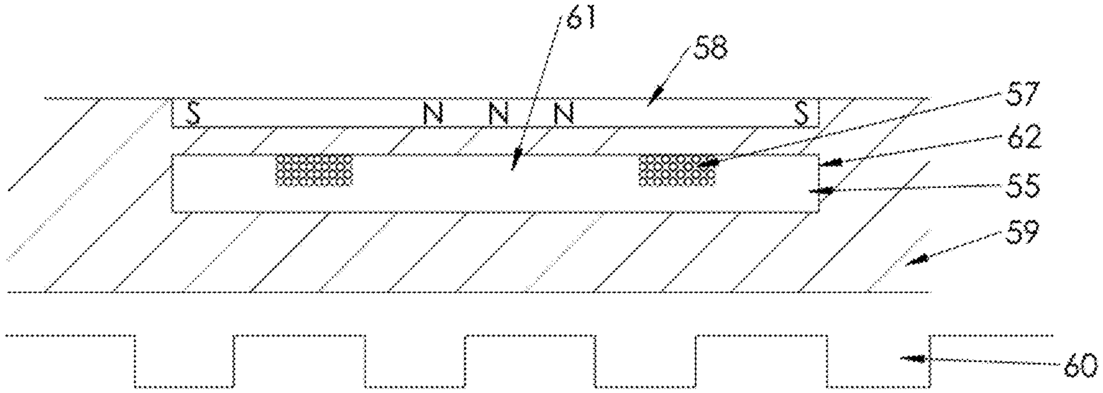

In yet another embodiment shown in FIGS. 13A-13C, a coil 57 (FIGS. 13B and 13C) is rigidly retained in an annular recess 56 (FIGS. 13A and 13C) in a ferromagnetic plate 55. The second member thereby comprises a coil 57 with an inner periphery that is wound about an inner former and a wall extending about an outer periphery of the coil. When current is passed through coil 57 it creates magnetic poles in the ferromagnetic material 55, with one pole, either north or south, forming in the centre or inner peripheral region 61 of the ferromagnetic material 55, and the opposite pole forming in the outer peripheral region 62. Compliant material 59 connects the coil 57/ferromagnetic material 55 assembly to a permanent magnet 58 that is proximal to the coil 57 face of the ferromagnetic material 55. (In some embodiments a plate of ferromagnetic material may replace permanent magnet 58.) Magnetisation of magnet 58 forms a permanent pole in the centre region and the opposite pole at the periphery, proximal to outer region 62 of the ferromagnetic material 55. In the embodiment shown compliant material 59 is the inner sole of a shoe, above outsole 60. Upper surface of magnet 58 sits flush with the upper surface of the inner sole 59.

Preferably coil is rigidly attached in ferromagnetic material. Preferably when current passes through the coil a face of the ferromagnetic material forms a north pole inside the coil and a south pole outside the coil. Preferably a magnet is positioned proximal to this face. Preferably the magnet is thin. Preferably an inner area of magnet proximal to face is either a south or north pole, and outer periphery proximal to face is the opposite pole. Alternatively, a ferromagnetic material is proximal to said face. Preferably a compliant material separates face from magnet/ferromagnetic material, whichever is applicable.

Non-Permanent Magnet (Ferromagnetic Attraction) Transducer

Figure 11:
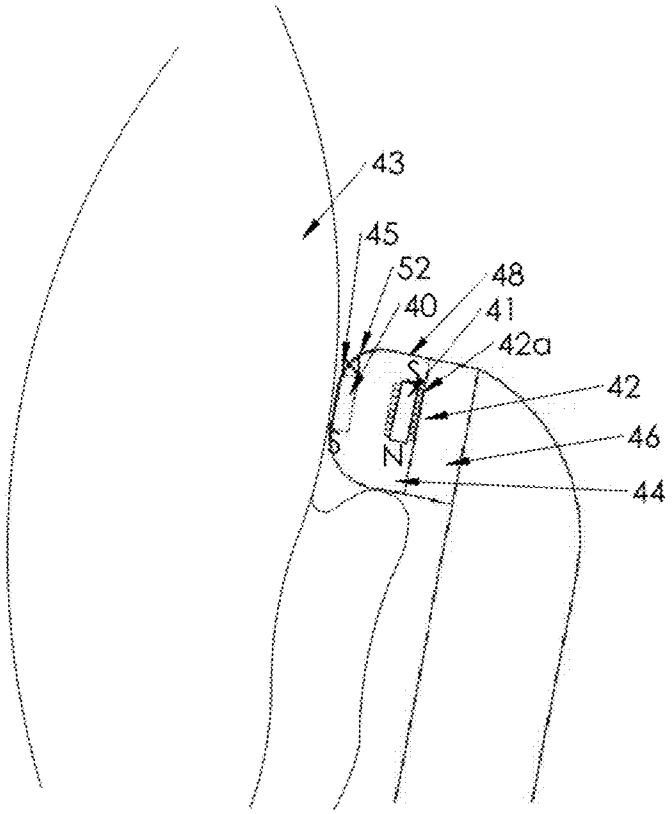
FIG. 11 is a close up of padding of another headphone apparatus embodiment incorporating haptic transducers of the invention.

FIGS. 11 and 12A-C show yet another embodiment of the invention. FIG. 11 illustrates a haptic transducer 52 embedded in and incorporated into headphone earpad 44 designed to apply vibration to a wearer's head 43. The transducer may be used in other wearable and/or handheld devices including, but not limited to, shoes, mobile phones, gloves, gaming controllers and the like.

A first magnetic member 40, made from steel or other ferromagnetic material or soft ferromagnetic material, optionally formed into a thin plate, is positioned proximal to, but compliantly separated from, a second magnetic member 42, which preferably comprises a coil 42*a*. The first member 40 is attached directly to the inside of fabric 45, for example via a double-sided adhesive. In alternative embodiments first member 40 may be embedded within earpad 44, which may ensure that first member 40 does not adversely affect comfort. In other embodiments there may be a thin layer of foam immediately below the fabric surface, at least in regions contacting the wearer's head, and this foam may optionally be more rigid to facilitate transfer of vibration to a wearer's head.

Coil 42*a* may be wound around another piece of ferromagnetic material 41 in order to enhance its electromagnetic field. First member 40 and second member 42 are preferably compliantly mounted relative to one-another in order to facilitate relative movement. In this embodiment the compliance is provided via earpad 48. In operation, a varying electrical excitation signal is applied to the coil 42*a* which then generates a magnetic field that interacts with first member 40.

Transducer 52 has advantages in that cost of manufacture may be reduced because there is no permanent magnet component, or there is no permanent magnet component that is contributing or significantly contributing to the haptic effect of the transducer. Also, since there is no permanent magnet, when the device is not operating there is no long-term force applied to compliant layers, regardless of whether there is ferromagnetic material rigidly attached to or near the coil to enhance its effect. This may be especially useful in this embodiment where compliance between the first member 40 and coil 42*a* is provided by soft foam 44 which may not necessarily have good creep resistance. The absence of a permanent magnet may furthermore permit multiple first members 40 to be located in proximity supported by soft foam 44. Because a ferromagnetic core 41 is used in conjunction with the coil 42*a*, without risk of permanent attraction to a magnet, the field generated by the coil may be increased without risk of collapsed foam resulting from static attraction.

Figure 12C:
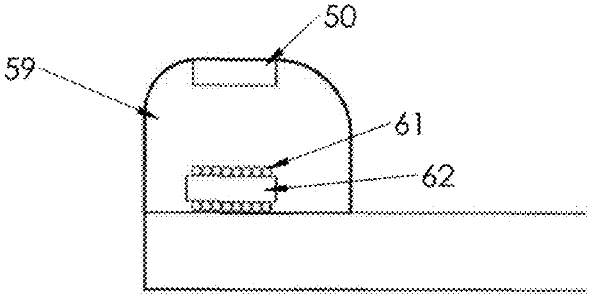

FIGS. 12A-12C illustrates yet another exemplary embodiment of the invention including a transducer 59 that is a variation on transducer 52.

Referring to FIG. 12A, the transducer comprises a series of ferromagnetic bodies 50 connected via hinges 51 is shown. The magnetic bodies 50 may be the first member body parts of a transducer or first members of multiple transducers, for instance. In this embodiment, the hinges 51 connected the bodies 50 in a substantially curved manner to follow the profile of a curved wearable and/or handheld device, such as a headphone earpad 52. The series of bodies 50 may optionally be bonded directly underneath a thin fabric covering over earpad 52, with recesses in pad 52 to retain magnetic parts 50 so that they do not protrude. In some embodiments the hinges may be omitted if static and in-use forces between bodies 50 are sufficiently small that foam does not unduly collapse due to magnetic forces.

The multiple first members 50 are positioned in close proximity to one-another bonded directly under fabric 60 that contacts the wearer's head in a headphone implementation. This may provide haptic actuation applied over a larger area of a wearer's head/body. In the case of a headphone, first members 50 may position above the ear, in situ, at the same side as headband 54, to apply force to a part of the user's head where a stronger haptics sensation is likely to be felt (relative to softer parts of the user's head).

FIGS. 12B and 12C show a single substantially curved coil 61 positioned directly underneath first members 50 and bonded to ear cup (not shown). The shape of coil 61 complements that of the series of first members 50. FIG. 12C shows coil 61 being wound around a substantially thin ferromagnetic plate 62. The plate may be made from a ferromagnetic steel, for example. The plate may be approximately 0.3 mm for instance, for a headphone application. Depending on current direction the coil may create varying magnetic poles 57 and 58, in-use.

This embodiment provides potential advantages including:

- deployable in applications with fairly thin real estate, due to the compact overall depth dimension of the transducer;
- may support loads, for example of a wearer of a shoe, which may potentially provide increased comfort;
- robust structure and design.

In this embodiment, the coil 61 does not repel first member 50 regardless of the direction of current (and/or voltage) flow in the coil. Both positive or negative current (and/or voltage) may result in attraction between the first member 50 and the coil 61 in the transducer.

Figure 14A:
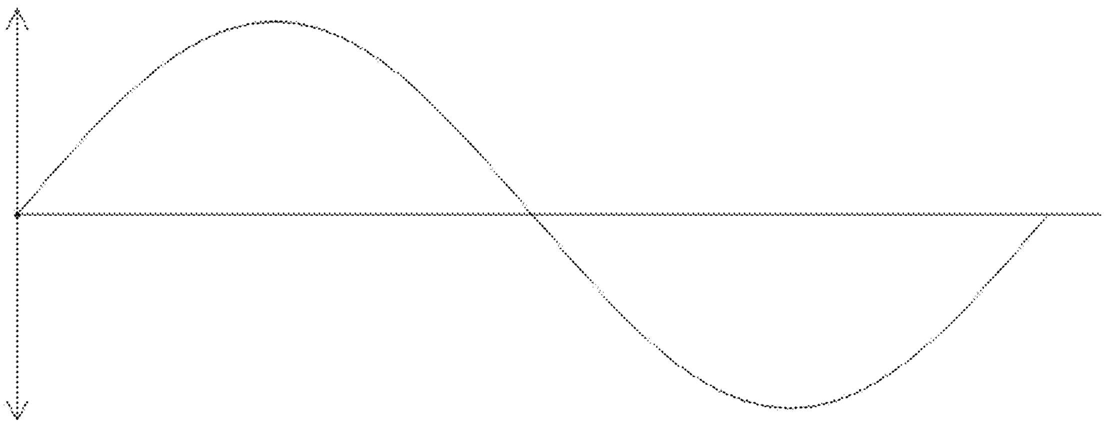
FIG. 14A shows an exemplary source signal to be applied to a haptic transducer embodiments of the invention.
Figure 14B:
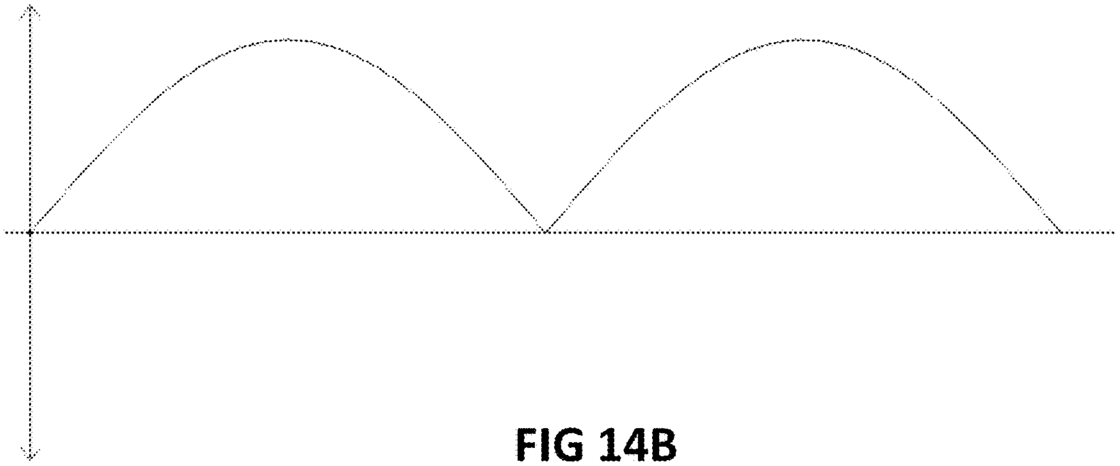
FIG. 14B shows force applied between first and second elements of a transducer embodiment in response to the source signal of FIG. 14A.

In this embodiment, if a sine wave, e.g., of frequency 100Hz, is applied to the transducer, as shown in FIG. 14A, this may result in force applied between the coil 61 and members 50 that resembles repeating positive half-sine cycles, as shown in FIG. 14B. The result may be a harmonically dense vibration output signal with a doubled fundamental frequency of 200Hz.

In some embodiments a haptics transducer device or system of the invention may further comprise a Digital Signal Processing unit configured to reduce distortion effects associated with the repeating positive half-sine cycles described above.

In any one of the embodiments described herein, the transducer may be controlled by an electronic circuit/amplifier, which may be embedded in the wearable or handheld apparatus. The signal driving the haptics transducer may be equalised.

In some embodiments predicted or actual excursion and/or maximum amplifier output are monitored, and the haptics drive signal is adjusted accordingly. For instance, low frequencies of the haptics drive signal may be attenuated, to avoid potential issues such as over-excursion. In some embodiments, a lumped parameter model of transducer characteristics is used for phase correction and/or excursion prediction. Alternatively, filters are used, for example IIR or FIR filters.

In the embodiments described herein, the haptic transducer may be configured to operate in conjunction with one or more audio and/or visual systems. The apparatus embodying one or more haptic transducer(s) (e.g., wearable and/or handheld device) may comprise a communication device for receiving electronic haptic signals to drive each haptic transducer. The apparatus may also comprise one or more processor(s) for processing and generating haptic signals for the haptics transducer. The apparatus may further comprise one or more visual and/or audio systems or may be associated/communicatively coupled to one or more visual and/or audio systems which are synchronously operated with the haptic transducer to provide a user of the apparatus with a multi-sensory experience. The haptic signals may be generated based on the audio and/or visual signals of the associated video and/or audio systems, or vice versa. For instance, a low pass filter may be utilised to generate the haptic signals from audio signals of an associated on-board or external loudspeaker. The signals may be processed on-board the apparatus or in an external device and received by the apparatus via the communication device. The communication device may be a wired or wireless communication device. A source signal may be processed by the apparatus or by an external device, and the haptic and audio and/or visual signals may be generated from the source signal by a common processer and then used to drive the relevant transducers and/or systems.

In some embodiments, the haptics transducer may be used in conjunction with an audio signal configured to drive a corresponding audio transducer of an electronic system. A signal to drive the haptic transducer may be the audio signal or it may be derived from the audio source signal. In some embodiments the audio source signal is directed to the audio transducer and a corresponding haptic signal is directed to the haptic transducer. In some embodiments, the haptics drive signal may be independently generated using an independent electronic drive circuit to the audio transducer, and phase corrected to substantially synchronise haptic forces generated by the haptic transducer with the audio generated by the audio transducer. This synchronisation may be at least for impulse signals associated with the audio transducer, for instance and may be particularly applicable to headphone implementations of the invention.

In other embodiments the haptic signal may be unrelated to an audio signal and/or there may not be any audio signal. For example, the haptic transducer may be part of a silent vibration alert, as is common in a mobile phone. The transducer may be driven by a different device, for example by a phone or watch, by means such as a wire or Bluetooth wireless connection.

Signal Processing for Haptic Signal

Modifying an Audio Signal for a Haptic Transducer

Because physical vibration at high frequencies tends to have low amplitude, higher frequencies may not be easily sensed, or it may not be typical for higher frequencies to be sensed, for example. When replicating such sensations, it may be possible to filter off higher frequencies. In some embodiments a signal processing device or system (herein referred to as signal processor), such as a Digital Signal Processor (DSP), may be incorporated in the apparatus comprising a haptic transducer(s) as described herein, or another associated system or device to modify an associated source signal and adapt the information for one or more haptic transducers.

In some embodiments of the invention, a signal processor associated with a haptic transducer may be configured to receive a drive signal associated with the haptic transducer and generate a modified drive signal for driving the haptic transducer. The method further comprises driving the haptic transducer using the modified drive signal.

In an embodiment, the modified drive signal may have high frequencies removed from the original drive signal. The signal processor may remove the high frequencies using a low pass filter, for instance. The low-pass filter may comprise a cut-off frequency of approximately 100Hz, or approximately 200Hz, or approximately 300Hz, for example. Advantages may include reduction in power consumption and increased amplitude capability of the transducer at lower frequencies.

In embodiments where the drive signal for the haptic transducer comprises a higher dynamic range than is optimal for the haptic transducer, the signal processor may be configured to alternatively or in addition modify the original drive signal to limit the dynamic range (for example using compression) to a value that is within a predetermined threshold associated with the haptic transducer. This may be useful, for example, if the haptic drive signal is, or is derived from, an audio source signal configured to drive an audio transducer (as opposed to, for example, being a specially generated vibration alert signal).

Accordingly, the signal processor may be configured to receive a drive signal, determine a value or values of one or more parameters indicative of haptic energy (e.g., kinetic energy of moving member and/or power of drive signal) that would be expended by the transducer in response to the drive signal, then transform the signal, for example via compression, such that one or more values indicative of haptic energy expended lie within target bounds.

In some embodiments source audio frequencies are converted to one or more target frequencies or bands at which transducer effectiveness is higher and/or where humans are more sensitive to haptic information. For example, in some embodiments, the signal processor may be alternatively or additionally configured to time one or more peaks in a received source drive signal within a first frequency range or ranges of a received drive signal for the haptics transducer, and replicate the one or more peaks at a second frequency range or ranges of the source signal that differs from the first frequency range or ranges to generate the modified drive signal. The peak(s) may be replicated by superimposing them onto the source signal at the second frequency range or ranges. The first frequency range or ranges are preferably lower than the second frequency range or ranges and non-overlapping. As an example, audio material in an audio range of say 160Hz-400Hz may generate negligible force on a user if passed straight to a haptic transducer. The signal processor may scan the audio track or other media or signal for events that are outside a predetermined threshold, such as volume that is above a predetermined threshold, within this range of frequencies. An example could be a gunshot in a game, for example. The signal processor may determine the event, or receive an indication of such an event by an external source, such as a game CPU for example, so that no audio signal is involved. Notification could involve loudness and positioning information as well. Such signal may be transformed, for example by slowing down to ¼ speed in the case of a 160-400Hz audio signal, leading to a 40-100HZ signal, or via conversion to a generic haptic 'shake' signal, for example, so that a new signal is created that will be more optimally be 'felt' by a user in proximity to a haptic transducer receiving the signal.

In some embodiments, the signal processor may alternatively or additionally receive a drive signal for the haptics transducer, and reduce a frequency of the drive signal to generate the modified drive signal. For example, the frequency or frequencies of the received drive signal may be determined by the signal processor and then reduced by 1 or two octaves, for example. Further alternatively, the frequency of the drive signal may be reduced to substantially below the easily-audible spectrum, for example to below approximately 25Hz, or approximately 20Hz, or approximately 15Hz, so that haptic sensation is provided via the modified drive signal, without significantly interfering with perceived frequency response or tone colours. These approaches may be useful in cases where the haptic transducer provides some degree of audible/sound pressure response additional to the primary nerve/touch stimulation such as may occur if the haptic transducer is located in proximity to the ear e.g., in a headphone, and/or where audio and haptic response is provided by the same transducer.

System architectures and signal processing techniques used with prior art haptics systems may be used in conjunction with transducers and systems of the present invention.

Signal Processing Tailored for a Non-Permanent Magnet-Based Transducer

In some embodiments of the invention, the signal processor may be configured to operate in association with a haptic transducer comprising a first member comprising a magnetic body that is not a magnet and a second electromagnet member, such as the haptic transducer of FIGS. 11 and 12A-12C. For such haptic transducers, there is a constant magnetic attraction between the first and second members when a drive signal is received by the transducer, regardless of the phase of the signal. This can create a distortion effect in the generated haptics output when the phase is reversed in a source drive signal. To avoid the distortion associated with the source phase reversal and thereby preserve the integrity of the input haptic signal, the source haptic signal may be modified by the signal processor before driving the haptic transducer. The following describes various signal processing methods by which this may be achieved. They may be used independently or in conjunction with one-another.

Figure 14C:
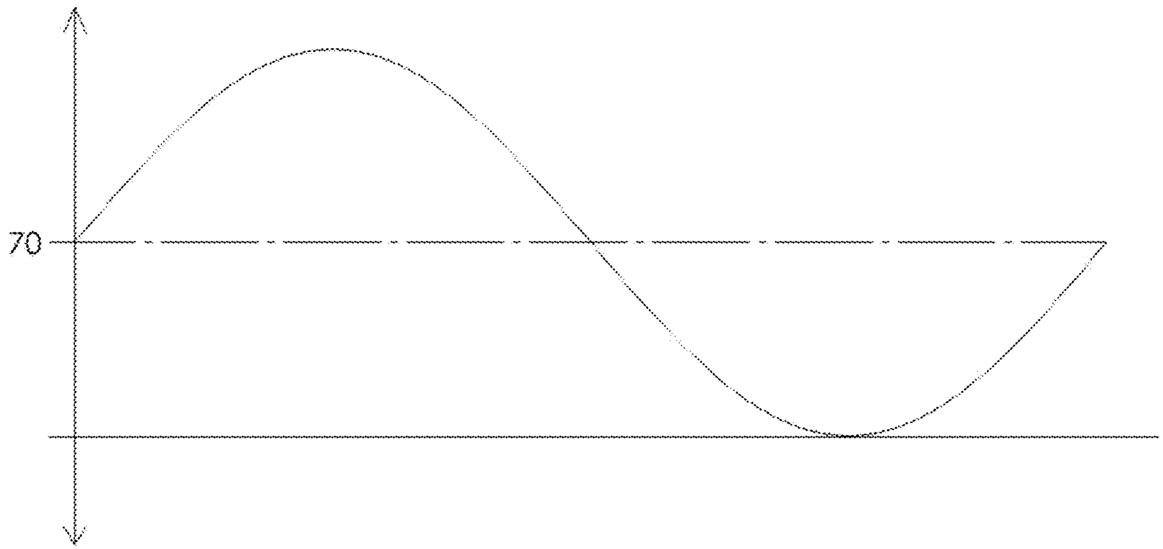
FIG. 14C shows a drive signal with an offset current.

Referring to FIG. 14C, in some embodiments the signal processor may be configured receive a drive signal (such as shown in FIG. 14A) for the haptics transducer and superimpose an offset current 70 (and/or voltage), onto the received signal to generate the modified drive signal. This may mean that when a source signal is zero, the applied offset results in a constant current 70 (and/or voltage) applied to the haptic transducer, which may act to displace it relative to its rest position when the source drive signal is non-existent. When the source signal varies either above or below zero, as shown in FIG. 14A, the current (and/or voltage) applied to the transducer may be varied from the offset value as shown in FIG. 14C, for example a positive source signal value may result in a further increase in current (and/or voltage) above the offset value, whereas a negative source signal value may result in a reduction in current (and/or voltage) compared to the offset value. In this way the distortion that occurs when the current going to the transducer changes from positive to negative direction or vice versa is eliminated, since this reversing of current direction is avoided through the application of the offset current 70. It can be seen that, aside from a DC offset 70, which will not be felt by a user due to the low frequency (in this case 0Hz), transducer output as shown in FIG. 14C resembles the source signal of FIG. 14A better than does the output shown in 14B for the case where no offset is applied.

Application of an offset to a source signal means that current is applied even when the source drive signal is at zero. This may increase power usage and/or may cause additional heating of the transducer and/or may necessitate an amplifier and other electronic devices that are capable of supplying DC signals.

In order to mitigate such disadvantages, in some embodiments the signal processor may be configured to receive a drive signal and superimpose a variable offset current (and/or voltage) onto the input drive signal to generate the modified drive signal. the signal processor may be configured to monitor the input drive signal and determine an amplitude value of the input drive signal, or a maximum amplitude value of the input drive signal. There may be different amplitudes and/or maximum amplitude values determined in positive and negative directions. If the amplitude and/or maximum amplitude are at zero or close to zero, the offset applied to the haptic transducer may be relatively low or zero. As maximum amplitude increases, the offset applied may be increased. In some embodiments, subject to limitations such as maximum system output, the offset may be increased to a sufficient level whereby the haptic signal may be reproduced without distortion created by a reversing of current direction.

Variation of offset current requires a compromise between latency, if an approach is taken where a signal processing algorithm checks in advance for a high amplitude input drive signal, versus failure to properly deliver sudden source signal transients, as may occur if the DC offset is insufficient to permit accurate reproduction.

If a signal processing algorithm checks in advance for a high amplitude source signal, there may be time to unobtrusively gradually increase an offset current/voltage to an amplitude sufficient to ensure the modified drive signal remains above a minimum amplitude of zero. In such an embodiment, the signal processor may be configured to determine, from a component of the input drive signal, a target offset current/voltage value, and then modify the input drive signal by superimposing: a gradually increasing offset towards the target offset value, followed by a uniform offset corresponding to the target offset value for a period corresponding to the period of the component of the input drive signal.

In this specification, a component of a signal is intended to mean an isolated finite period of the signal.

Figure 15A:
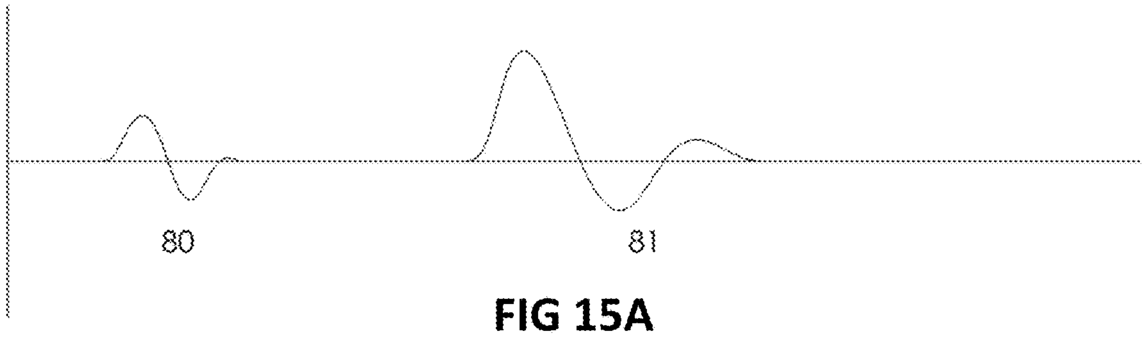
FIG. 15A shows a haptic source signal comprising two transient features.
Figure 15B:
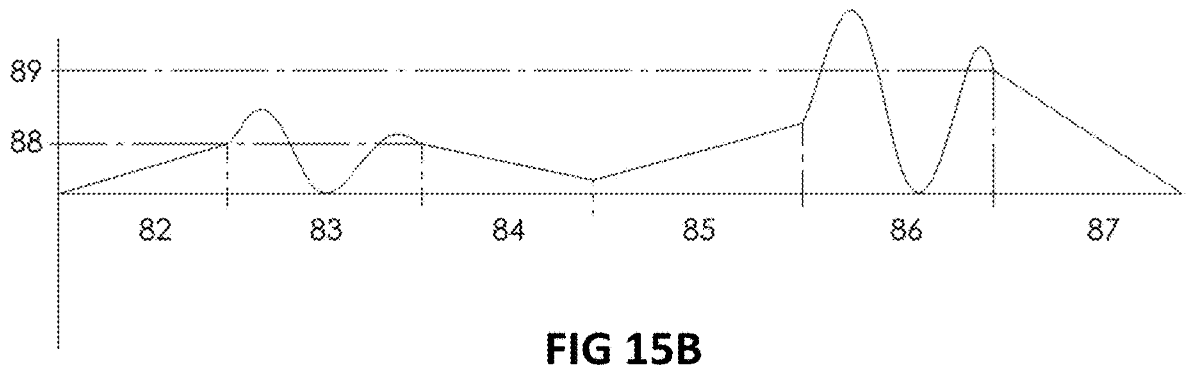
FIG. 15B shows a calculated input signal for a haptic transducer that has a variable DC offset applied.

The signal processor may be further configured to superimpose an offset gradually reducing toward zero following the period of with the component of the input drive signal. The signal processor may then be configured to maintain a substantially zero offset until another future component is identified. These steps may be repeated for one or more identifiable components of the input drive signal, which may correspond to impulses of the input drive signal for instance. FIGS. 15A and 15B provide an example of this functionality of the signal processor of the system.

FIG. 15A shows a haptic source signal comprising two transient signal components 80 and 81 for instance, where component 81 comprises a higher maximum amplitude than component 80. FIG. 15B shows a calculated input signal for a haptic transducer that has a variable DC offset applied by a signal processor of the invention to prevent reversal of current in the transducer while minimising or reducing power usage. During time-period 82, the signal processor is configured to superimpose a gradually increasing DC offset to the input drive signal until a determined amplitude 88 is reached. The amplitude 88 may be determined by the signal processor from the signal component 80 of the input drive signal and is sufficient to offset the amplitude of the signal component 80 to above zero as shown in FIG. 15B. The signal processor is further configured to superimpose a substantially uniform DC offset to the input drive signal in a succeeding time period 83 corresponding to the time period of component 80 of the input drive signal. The uniform offset is at approximately amplitude 88. As shown in FIG. 15B there is no current reversal for signal component 80 in the modified drive signal, so associated distortion is reduced or eliminated.

Following the time period 83 associated with signal component 80, the signal processor may be configured to gradually reduce the DC offset down towards zero. The signal processor may maintain a consistent zero offset during this period until another uniform or gradually increasing offset is required based on the input drive signal. For example, for signal component 81 of the input drive signal, the signal processor may determine a uniform DC offset amplitude 89 that would maintain the modified drive signal above zero during the entire period of signal component 81, and gradually increase the offset toward this amplitude 89. This may occur during period 85 of the modified drive signal as shown in FIG. 15B, for instance. When the amplitude 89 is reached, the signal processor applies a substantially uniform offset at amplitude 89 during the period 86 corresponding to component 81. Following this period, at period 87, the signal processor superimposes an offset gradually reducing toward zero on the input drive signal.

Preferably the rate of gradual increase or gradual decrease of the offset applied by the signal processor (e.g., during periods 82, 84, 85, and 87) is sufficiently low that minimal haptic sensation is felt by the user at times that do not correspond to information in the source signal. In alternative embodiments gradual increase/decrease of the offset accelerates and decelerates in order to minimise the amount of higher-frequency content.

Note that in this embodiment latency is created because the algorithm must look ahead for a period of time sufficient to determine the required offset amplitude and gradually increase the offset superimposed onto the input drive signal until the required offset amplitude is reached. In the case of FIGS. 15A and 15B, the latency is a function of one or both of periods 82 and 85, for instance.

In some embodiments, instead of determining a target offset level based on future behaviour of the input drive signal, the signal processor may be configured to, in substantially real time, superimpose a gradually increasing DC offset onto the input drive signal upon detection and/or prediction of an unwanted current phase change. If no phase change is detected for a certain time period, the signal processor may be configured to gradually decrease the DC offset toward zero.

Figure 16A:
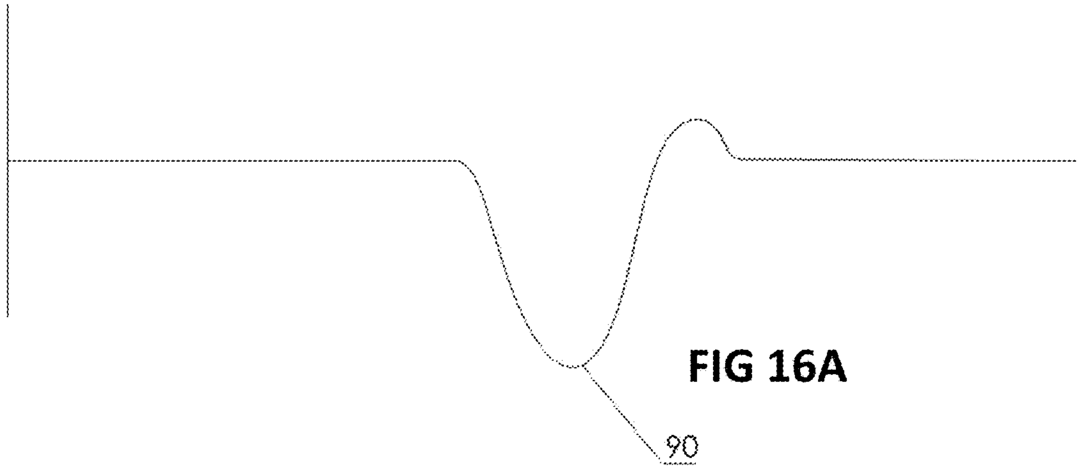
FIG. 16A shows another source signal that may be applied to a haptic transducer embodiment of the invention.
Figure 16B:
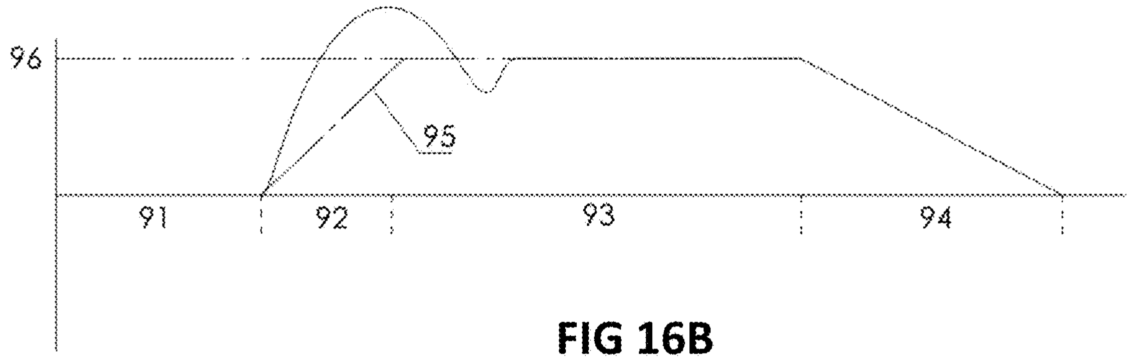
FIG. 16B shows an input signal for a haptic transducer calculated by a DSP embodiment of the invention.

In some embodiments, the signal processor may be alternatively or further configured to monitor an initial phase of a transient input drive signal. Referring to FIG. 16A, an exemplary input drive signal is shown having an initial pulse component 90 with a negative phase. Referring to FIG. 16B, a modified drive signal generated by the signal processor is shown. In this example, the signal processor is configured to determine a phase of a future component of the input drive signal and accordingly reverse the phase of the input drive signal for that component to generate the modified drive signal, if the phase meets a predetermined criterion or criteria. The predetermined criteria or criterion being a negative phase in this example.

In the example shown, the signal processor does not implement a gradual increase of a DC offset for the initial negative phase component. Instead, during time period 91, the modified signal remains substantially the same as the input drive signal (substantially at zero in this example). At time period 92, the modified drive signal reverses the phase of the input drive signal so that it can reproduce initial pulse 90 synchronously, but with the phase reversed. Following this, the signal processor superimposes a gradually increasing DC offset 95 toward a determined target amplitude 96. During the time period 93, the signal processor continues to replicate the input drive signal and retains a substantially consistent offset 96 for a time. After a predetermined period (e.g., 20 seconds) of a substantially zero amplitude or no input drive signal, the signal processor may proceed to gradually decrease the amplitude of the modified drive signal toward zero. as shown during time period 94.

The present invention may provide any one or more of the following advantages compared to prior art haptic transducers including:

- Simplicity
- Low parts count
- Robustness
- Reduces difficulty with bonding transducer to a shoe insole for footwear applications while contributing to support of relatively large mass of wearer. This is achieved by locating transducer close to weight bearing parts of shoe therefore requiring lower vibration amplitudes for haptics sensation. The shape of the transducer also acts to support load of foot, 3) imposes smaller rigid zone—less stress raiser at periphery, potentially improved comfort. The transducer is not suspended but embedded within the shoe with support below actuator, so low frequency roll off may be at a lower rate, and overall mass may potentially be less, versus an inertial actuator configuration.
- Low cost of manufacture
- Slim form factor meaning may fit into wearable or handheld apparatus without significantly affecting size of apparatus and can facilitate positioning close to areas of device configured to apply high pressure on a user, e.g., facilitates positioning close to load bearing parts of foot, including proximal to the ball of the foot where the sole of typical shoes is often quite thin
- Improved comfort, including:
  - It is comparatively easy for designers to incorporate transducers without risk of reducing user comfort due to, for example, lumps at or around transducer.
  - It is comparatively easy for designers to incorporate transducers with reduced risk of loss of comfort over time as various foams compress for example with age.
  - smaller rigid zones in insole, headphone earpad—more flexible all else being equal
  - takes load through transducer—may be designed more seamless. In prior art devices where the transducer cannot support load, this requires a rigid zone across insole to support load around the transducer, and/or foot may be supported more around periphery of transducer—uneven support means reduced comfort.

The signal processor embodiments described herein may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine-readable mediums for storing information. The terms "machine readable medium" and "computer readable medium" include but are not limited to portable or fixed storage devices, optical storage devices, and/or various other mediums capable of storing, containing, or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

One or more of the components and functions illustrated the figures may be rearranged and/or combined into a single component or embodied in several components without departing from the invention. Additional elements or components may also be added without departing from the invention. Additionally, the features described herein may be implemented in software, hardware and/or combination thereof.

The foregoing description of the invention includes preferred forms thereof. Modifications may be made thereto without departing from the scope of the invention as defined by the accompanying claims.

The invention claimed is:

1. A wearable or handheld device comprising:

a base;

a substantially compliant layer of padding coupled to the base for providing comfort to a user of the device; and a haptics transducer comprising:

a first member;

a second member; and a substantially compliant member coupled to and between the first member and the second member;

wherein the first member is operatively coupled to, and reciprocally movable relative to, the second member in response to received electrical signals; and wherein the second member is coupled to the base via a connection that is independent of the compliant member.

2. The device of claim 1, wherein the compliant member maintains substantially constant contact with both the first member and the second member when the device is in use.

3. The device of claim 1, wherein a majority of an outer periphery of the compliant member extends substantially within or is substantially contained within an outer periphery or boundary of the first member or of the second member, or both, about an axis of movement of the first member relative to the second member.

4. The device of claim 3, wherein the compliant member is substantially wholly within the outer periphery or boundary of the first member or the outer periphery or boundary of the second member, or both.

5. The device of claim 1, wherein the base is substantially incompressible or less compressible relative to the compliant layer of padding.

6. The device of claim 1, wherein the base is substantially rigid.

7. The device of claim 1, wherein the first member of the haptics transducer is contained and embedded within the layer of padding.

8. The device of claim 1, wherein the first member is substantially wholly contained and embedded within the compliant layer of padding.

9. The device of claim 1, wherein the second member is coupled to the base.

10. The device of claim 9, wherein an overall compliance between the second member and the base is lower than a compliance between the first member and the second member.

11. The device of claim 9, wherein the second member is rigidly coupled to the base.

12. The device of claim 9, wherein the second member is compliantly coupled to the base.

13. The device of claim 1, wherein the second member remains substantially stationary and the first member moves relative to the second member during operation of the haptics transducer.

14. The device of claim 13, wherein the device further comprises a second substantially compliant layer of padding coupled to the base, wherein a majority of the second member is embedded within the second substantially compliant layer of padding.

15. The device of claim 14, wherein the second member is substantially wholly contained and embedded within the second substantially compliant layer of padding.

16. The device of claim 1, wherein the first member is located proximal to a surface of the device that is configured to engage a user in use, and the second member is located substantially distal to the surface relative to the first member.

17. The device of claim 1, wherein the substantially compliant layer of padding comprises a foamed material.

18. The device of claim 1, wherein an overall compliance, per unit area of a connection between the first member and the second member is substantially the same or lower than a compliance, per unit area between a wearer's bones and the first member, in use.

19. The device of claim 1, wherein an overall compliance of the device exhibited by a user in a region of the haptics transducer in use is substantially the same or similar to an overall compliance exhibited by a user in regions that surround the haptics transducer.

20. The device of claim 1, wherein the first member or the second member comprises an electromagnet having a coil, and wherein the coil is wound about an axis that is substantially perpendicular to the axis of relative linear motion between the first member and the second member.

* * * * *